July 12, 1932.    L. C. WARNER    1,866,606
TIME-OF-DAY ANNOUNCING SYSTEM
Filed March 23, 1931    12 Sheets-Sheet 1

INVENTOR
L.C. WARNER
BY P.C. Smith
ATTORNEY

July 12, 1932.  L. C. WARNER  1,866,606
TIME-OF-DAY ANNOUNCING SYSTEM
Filed March 23, 1931  12 Sheets-Sheet 2

INVENTOR
L.C. WARNER
BY P.C. Smith
ATTORNEY

July 12, 1932.  L. C. WARNER  1,866,606
TIME-OF-DAY ANNOUNCING SYSTEM
Filed March 23, 1931  12 Sheets-Sheet 4
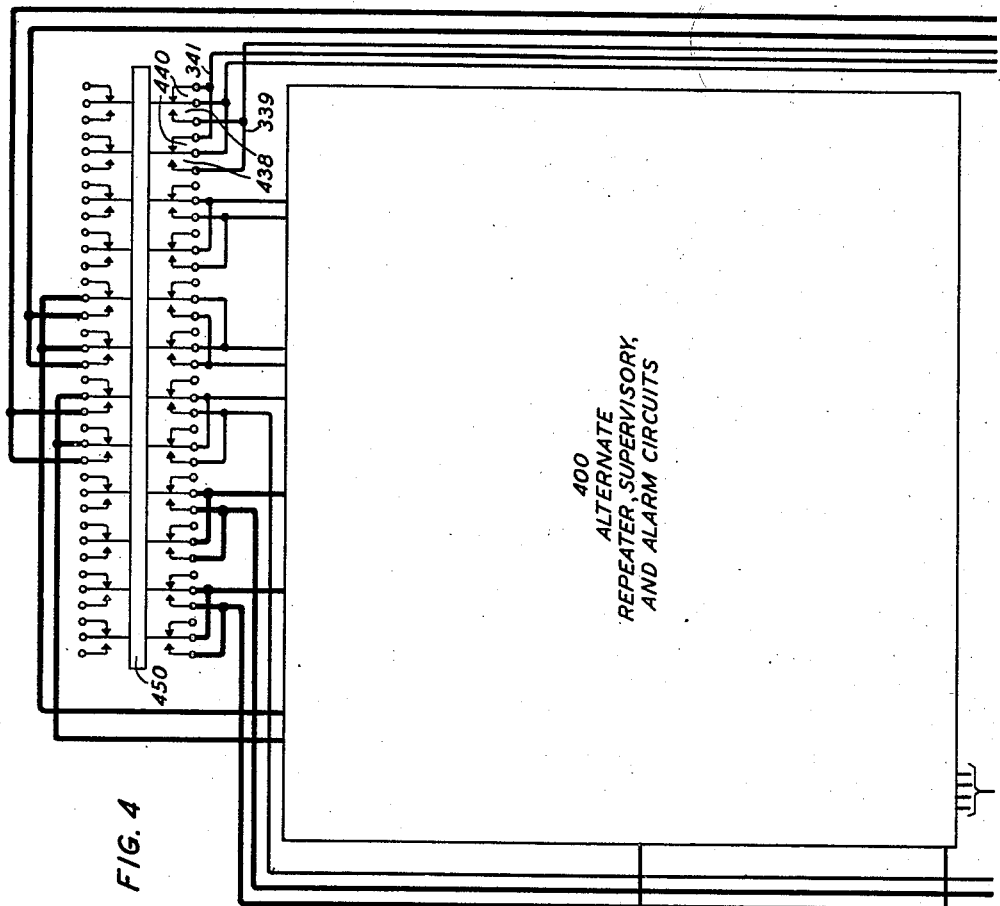
FIG. 4
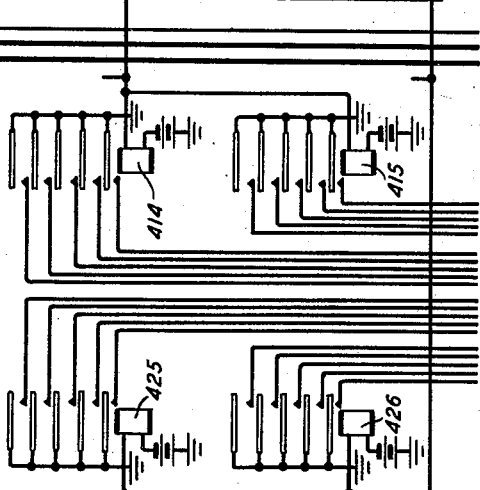
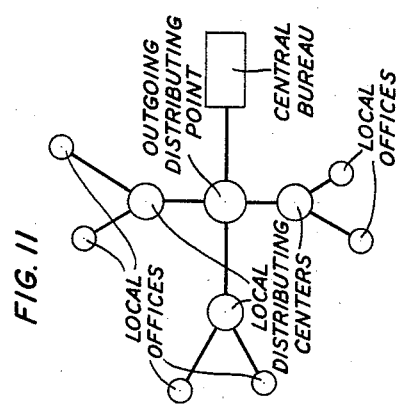
FIG. 11
INVENTOR
L.C. WARNER
BY P. C. Smith
ATTORNEY

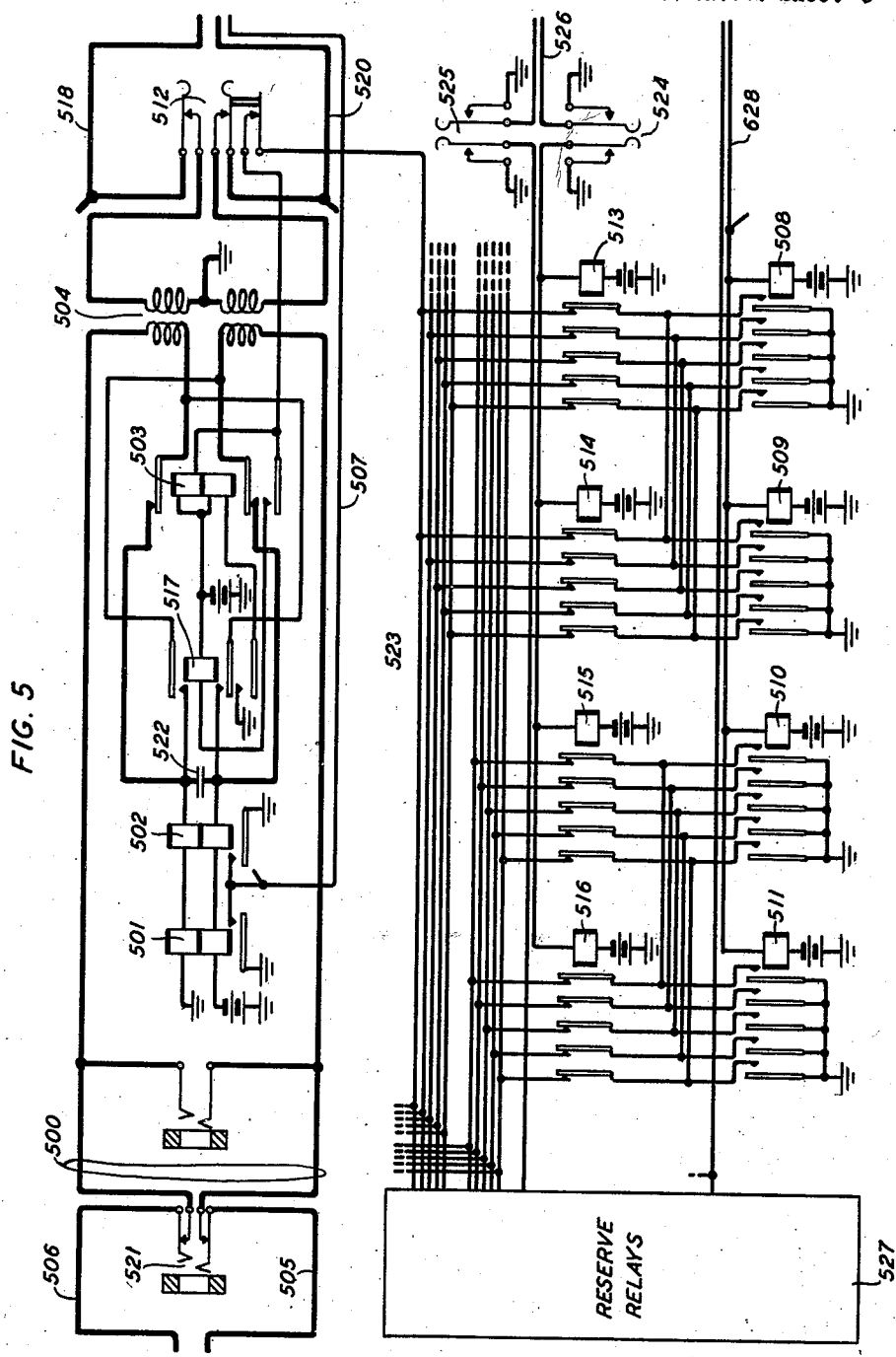

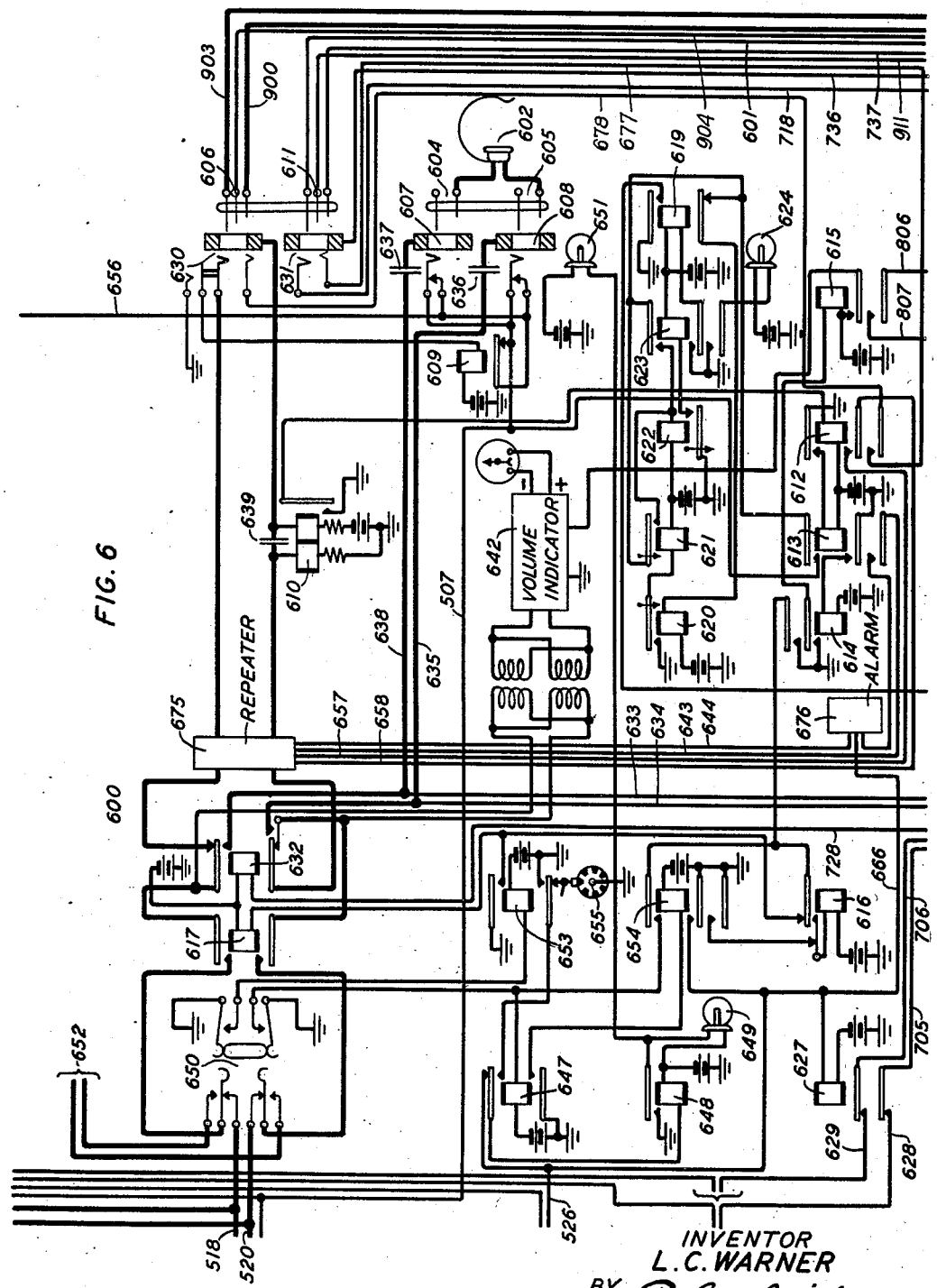

July 12, 1932.   L. C. WARNER   1,866,606
TIME-OF-DAY ANNOUNCING SYSTEM
Filed March 23, 1931   12 Sheets-Sheet 7
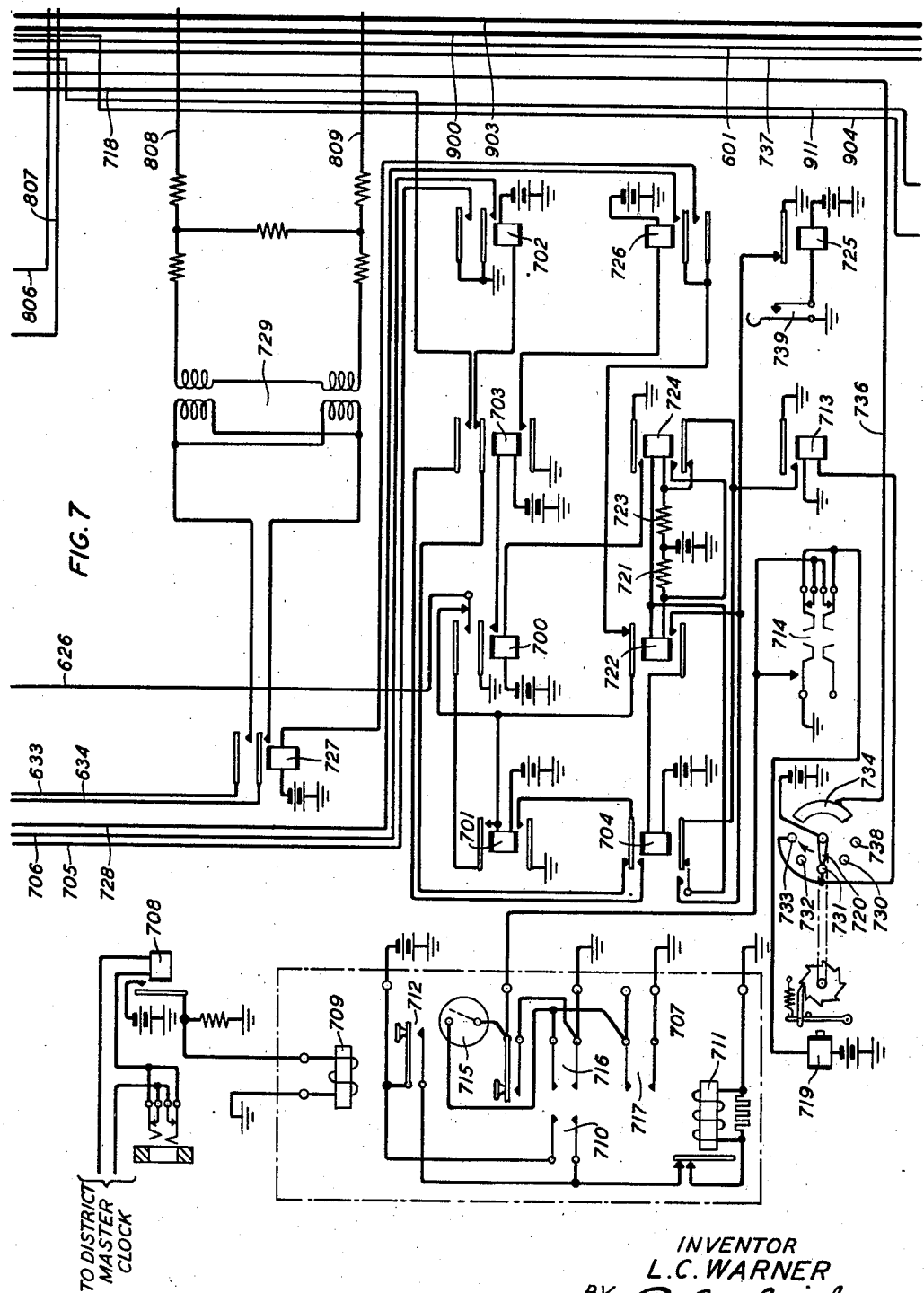
INVENTOR
L.C. WARNER
BY
ATTORNEY July 12, 1932.  L. C. WARNER  1,866,606
TIME-OF-DAY ANNOUNCING SYSTEM
Filed March 23, 1931  12 Sheets-Sheet 8
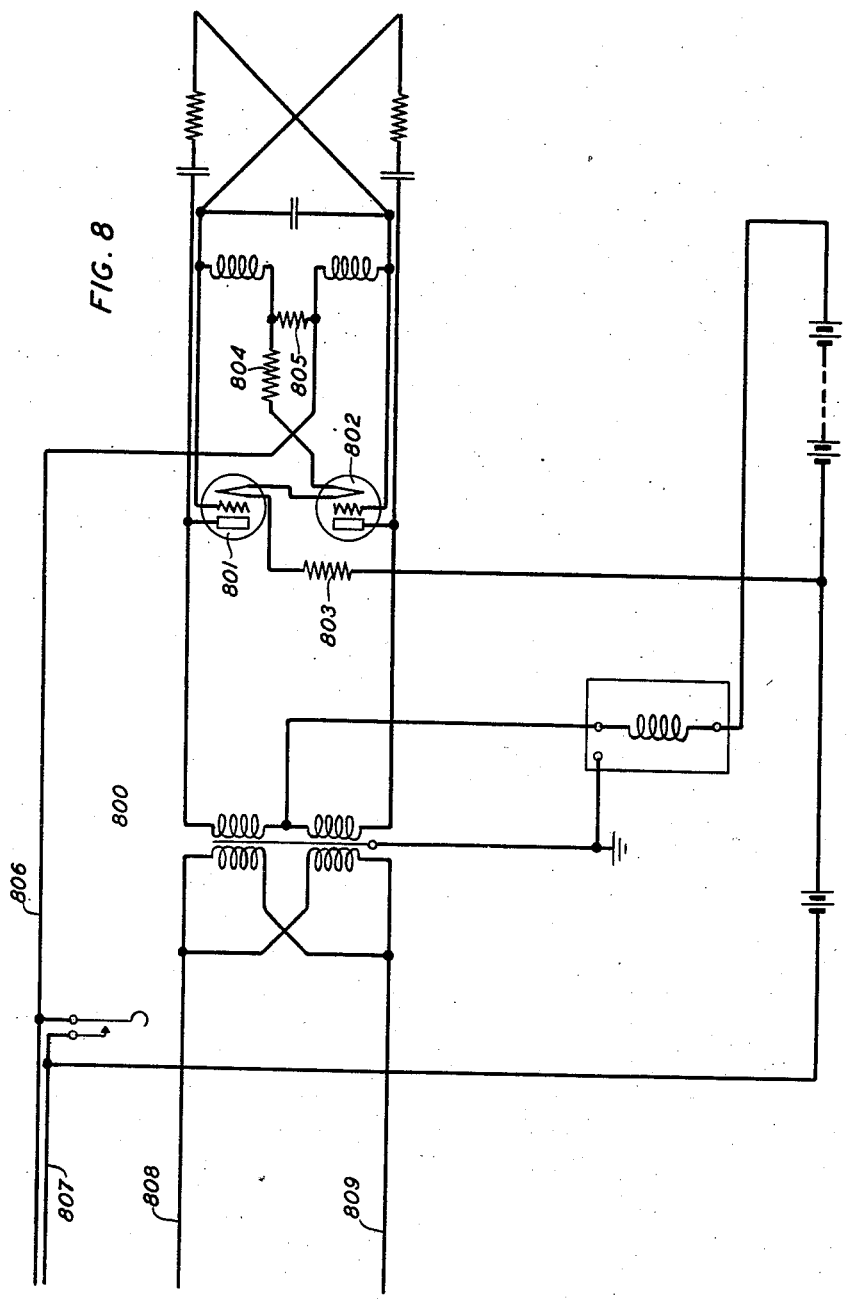
INVENTOR
L.C.WARNER
BY P.C.Smith
ATTORNEY July 12, 1932.  L. C. WARNER  1,866,606

TIME-OF-DAY ANNOUNCING SYSTEM

Filed March 23, 1931  12 Sheets-Sheet 9

INVENTOR
L.C. WARNER
BY P.C. Smith
ATTORNEY

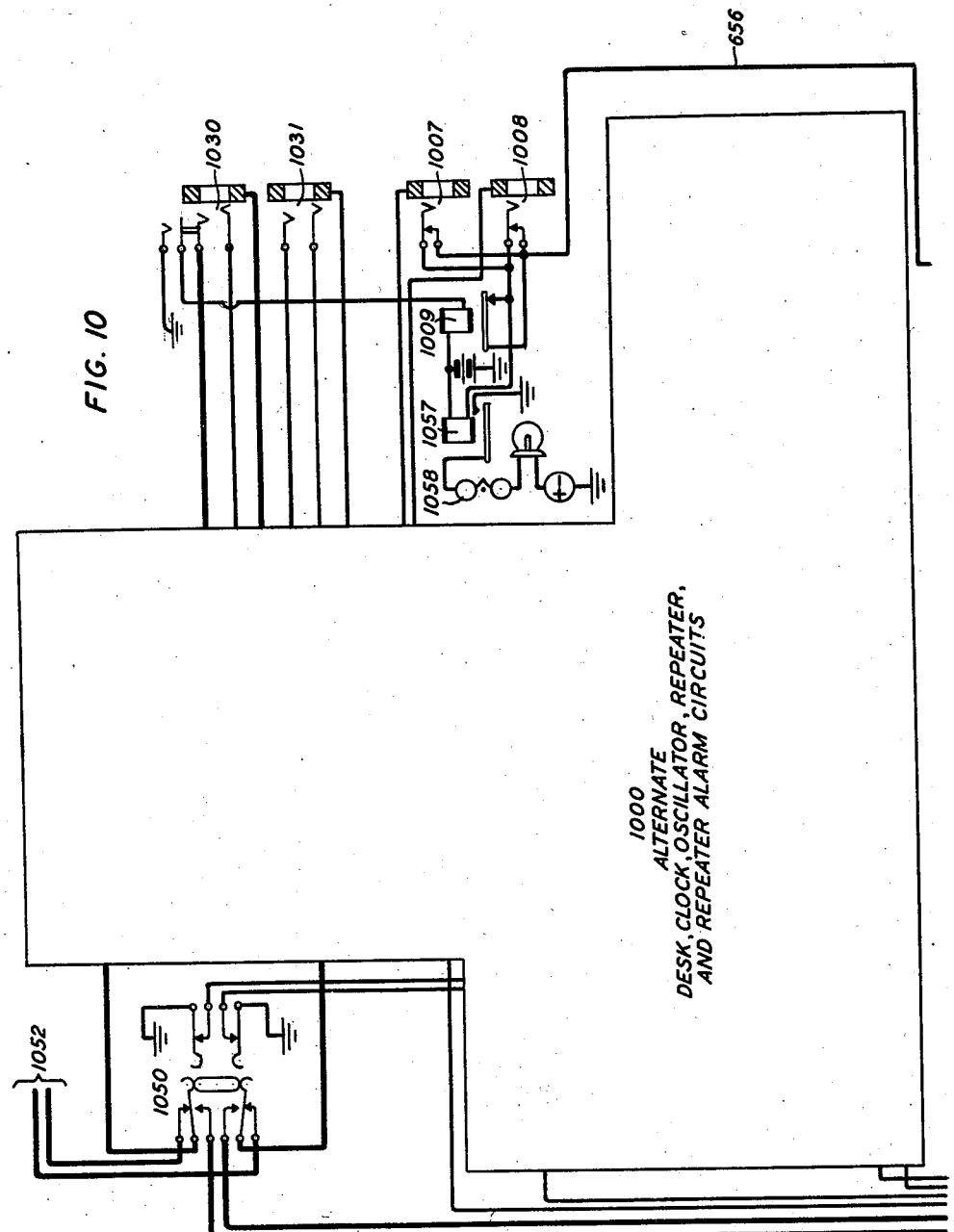

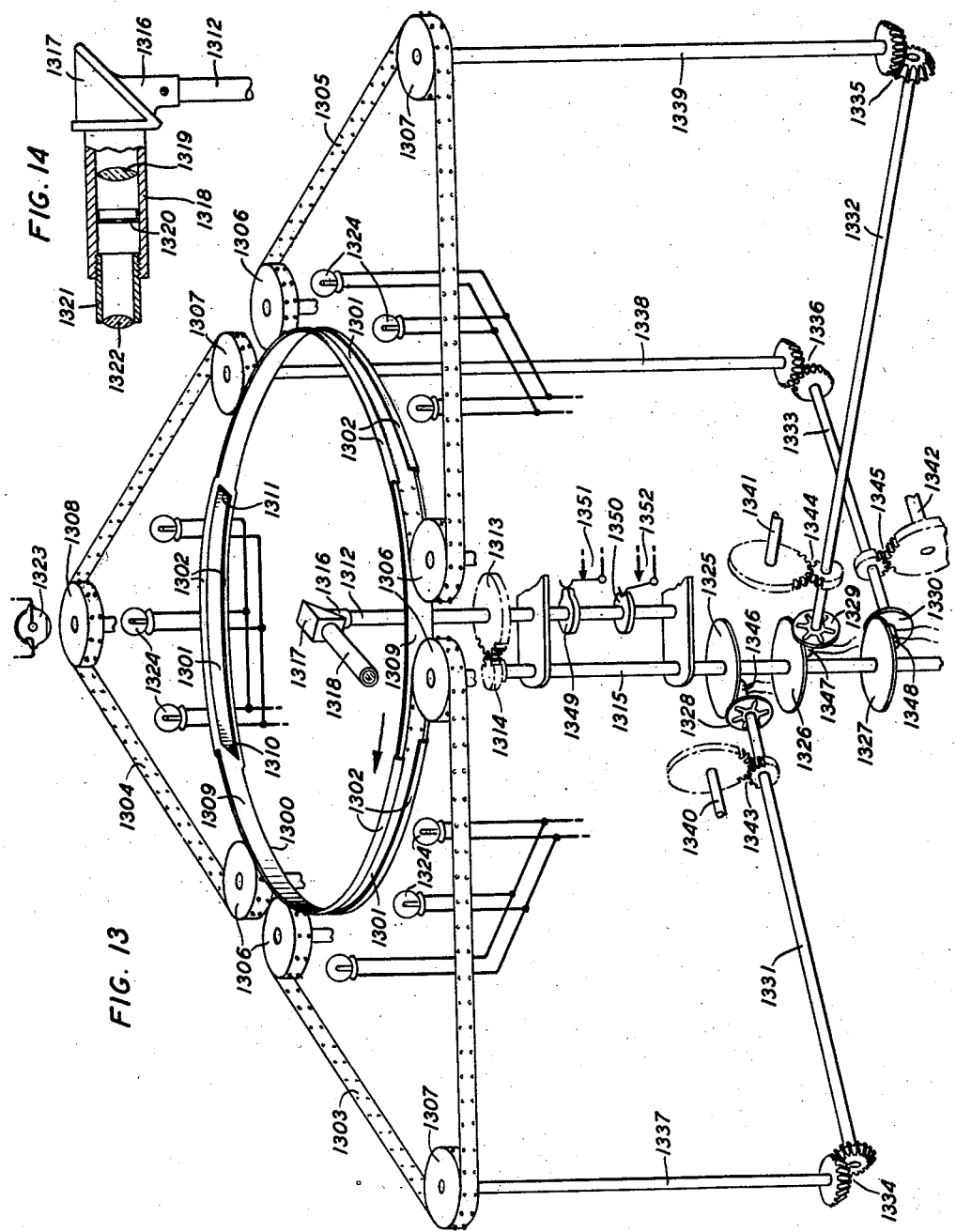

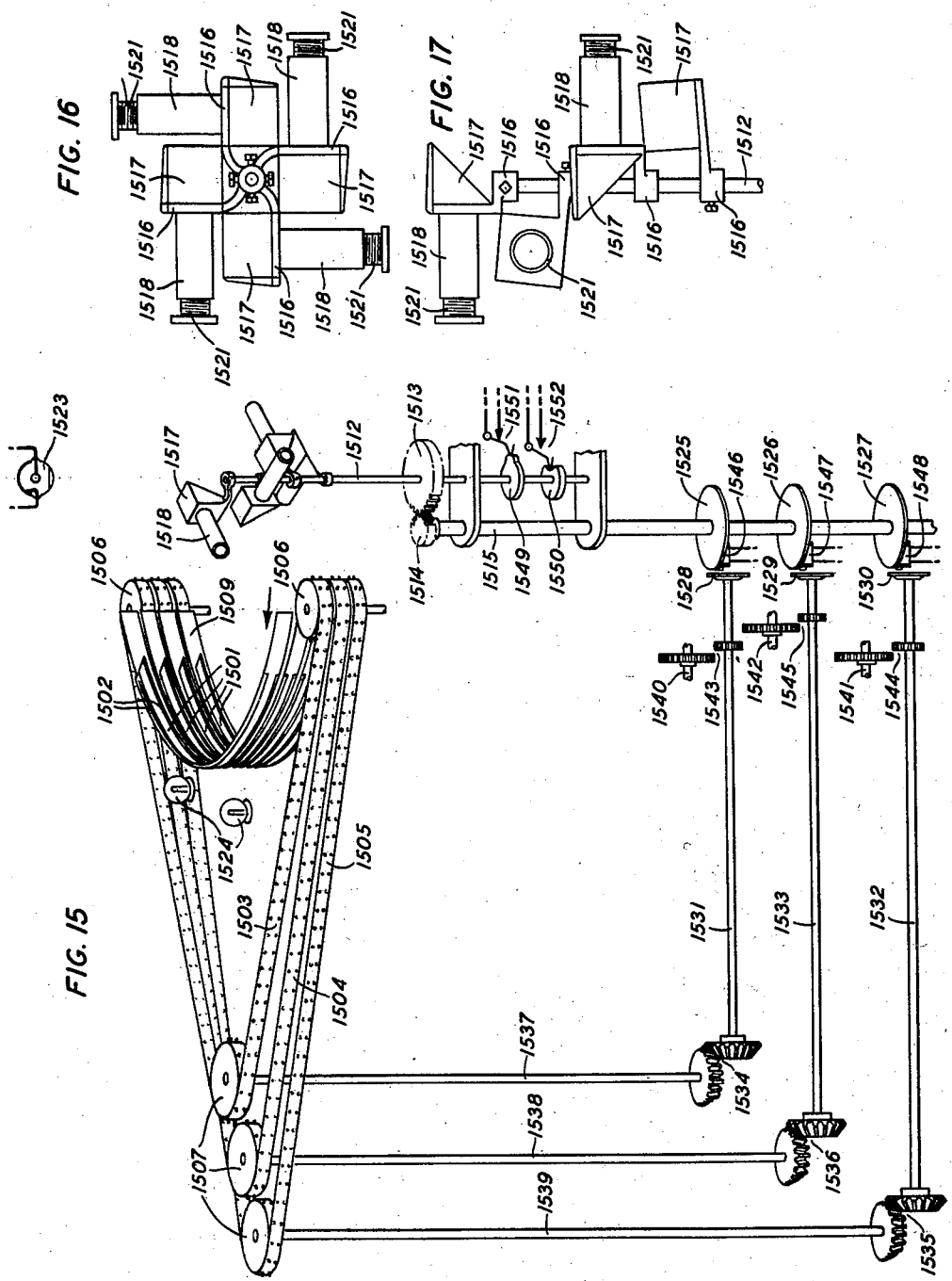

Patented July 12, 1932

1,866,606

UNITED STATES PATENT OFFICE

LESTER C. WARNER, OF PLAINFIELD, NEW JERSEY, ASSIGNOR TO WESTERN ELECTRIC COMPANY, INCORPORATED, OF NEW YORK, N. Y., A CORPORATION OF NEW YORK

TIME-OF-DAY ANNOUNCING SYSTEM

Application filed March 23, 1931. Serial No. 524,496.

This invention relates to time announcing systems which are more particularly adapted for use in connection with telephone exchanges although equally well adapted for use in announcing program periods for classrooms of schools or colleges or for making other announcements of varying and recurring nature.

The object of the invention is the provision of means whereby at periodically recurring intervals announcements of the time of day may be transmitted over a signal circuit to a plurality of stations which may at the time be connected for the reception of such announcement.

Heretofore time announcing systems have been proposed for use in telephone exchanges whereby a subscriber desiring to ascertain the correct time could either manually through an operator's position or automatically by dialing a predetermined number obtain connection with a special circuit upon which time-of-day announcements were impressed by phonographic means. One such system designed for installation in an automatic telephone system is disclosed in the patent to Blessing 1,227,523 issued May 22, 1917. In this system a phonograph employing record cylinders is employed for reproducing at definite time intervals and transmitting to a telephone circuit the correct hour and minute of the time of day.

In accordance with the present invention any subscriber of an automatic telephone exchange system desiring to ascertain the correct time dials a particular number and thereby obtains connection with a circuit including an improved time-of-day announcer. The announcer in accordance with one embodiment of the invention comprises three films of the general type used in talking motion pictures. One film has photographed thereon the sound traces corresponding to the hours of the day, one to twelve inclusive. The second film has photographed thereon sound traces corresponding to the numbers ten to twenty inclusive, thirty, forty and fifty and the third film has the sound traces of the numbers one to nine inclusive. The three films are so controlled by a clock that they may each be advanced periodically to expose a portion thereof to a scanner so that at any minute of the day the three films expose sound traces of the hour and the particular minute of that hour. The exposed portions of the three films are disposed in arcs having a common axis and are illuminated by separate sources of light.

Disposed in the axis of the three arcuate portions of the three films and in the plane of the center line of the films is a scanning prism driven at a constant speed by a suitable motor. As the prism is rotated by the motor it scans in succession the exposed arcuate portions of the three films whereby flashes of light are transmitted in succession from the sources of light through the sound traces on the films to a photoelectric cell positioned in alignment with the scanning prism. The light flashes received by the photoelectric cell are thereupon effective through the well known properties of such a cell to cause telephonic currents of varying strength to flow through its filament into the input transformer of an amplifier. The relatively weak current impulses thus generated by the cell are then amplified and impressed upon the telephone lines which are at the time connected with the announcing apparatus.

For example, if the hour film is positioned with the sound trace for the hour twelve exposed to the scanning prism, the second film is positioned with the sound trace for the number fifty exposed, and the third film is positioned with the sound trace for the number nine exposed, then as the prism scans the three films in the order named flashes of light will be successively transmitted to the photoelectric cell which will in turn transmit through the amplifier telephonic currents which will produce in the subscriber's receiver the spoken words "twelve fifty-nine". Provision is made so that the transmission of telephonic currents corresponding to a time announcement will commence only at the beginning of an announcement. Thereby no subscriber upon establishing a connection to the announcer will receive a fragmentary announcement. If considered desirable each time announcement may be prefaced by the expression "the tone will indicate" and terminated by the expression "o'clock".

In accordance with a further modfication of the invention the announcer may comprise four films. On one film may be photographed a sound trace corresponding to the expression "the tone will indicate". On a second film may be photographed sound traces corresponding to the hours of the day one to twelve inclusive. On a third film may be photographed sound traces corresponding to the numbers ten to twenty inclusive, thirty, forty and fifty and on the fourth film sound traces of the numbers one to nine inclusive. The first film may be fixed and the last three films arranged to be controlled by a clock in such a manner that each of the latter three films may be advanced periodically to expose portions thereof to a scanner so that at any minute of the day the four films will expose sound traces corresponding to the expression "the tone will indicate" followed by the hour and the particular minute of that hour. The four exposed portions of the four films are disposed in arcs of 90° each, superimposed one above the other having a common axis and are illuminated by sources of light.

Disposed in the axis of the four arcuate portions of the four films is a shaft driven at a constant speed by a suitable motor and carrying four scanning prisms and associated lens systems, each such scanning prism and associated lens system being so disposed with respect to one of the arcuately disposed films as to transmit flashes of light from the sources of light through such film to a photoelectric cell positioned in alignment with the axis of the scanner shaft. The four scanning prisms and associated lens systems are disposed angularly around said shaft 90° apart so that in the rotation of the shaft the four films are scanned in succession. The light flashes received by the photoelectric cell are effective to cause telephonic currents of varying strength to flow therethrough into the input transformer of an amplifier and by the amplifier impressed upon the connected telephone lines.

Should it be found desirable to suffix an announcement of the word "o'clock", a fifth fixed film could be placed beneath the fourth or minute film to be scanned by a fifth prism and associated lens system. In this case the exposed portion of each of the five films would occupy a 72° arc of the periphery of the circle in the axis of which the scanner shaft is positioned and the scanning prisms would be disposed around the axis of the shaft 72° apart.

A clearer conception of the scope and purpose of the invention will be obtained from a consideration of the following description taken in connection with the attached drawings in which:

Fig. 1 shows the line of a subscriber A terminating in an office of an exchange area, the schematic representation of a line finder, a link circuit having a line finder selector and sender selector by means of which the line may became connected with a central office register sender, a register sender indicated by the rectangle in the lower portion of the figure and the schematic representation of a district selector and office selector by means of which the line may be further extended;

Fig. 2 shows an outgoing trunk extending to a local distributing center shown in Fig. 3;

Figs. 3 and 4 taken together show apparatus at a local distributing center, Fig. 3 showing an extension of the trunk of Fig. 2 extending over a two-wire trunk to the outgoing distributing point of Fig. 5 and in the left portion of the figure the supervisory circuits of other trunks similar to the trunk of Fig. 2 which are also multipled to the trunk of Fig. 3, and Fig. 4 showing schematically alternate repeater, supervisory and alarm circuits which may be used in place of similar circuits shown in Fig. 3;

Fig. 5 shows the other end of the two-wire trunk extending to the local distributing center of Figs. 3 and 4 and apparatus at an outgoing distributing point;

Figs. 6 to 10 inclusive, taken together, show apparatus at a central time announcing bureau. Fig. 6 shows one transmission circuit at the central bureau; Fig. 7 shows the clock circuit, Fig. 8 shows an oscillator circuit and Fig. 9 shows the circuit of an announcing machine, the circuits of Figs. 7, 8 and 9 being individual to the transmission circuit of Fig. 6. Fig. 10 shows schematically an alternate transmission circuit and associated circuits which may be used in place of the similar circuits of Figs. 6 to 9 inclusive;

Fig. 11 is a diagram showing schematically the arrangement of talking facilities for connecting a plurality of offices through local distributing centers and an outgoing distributing point with a central time announcing bureau;

Fig. 12 is a diagram showing how Figs. 1 to 10 inclusive should be assembled to disclose the detailed circuits of the invention;

Fig. 13 shows schematically the mechanism of the preferred embodiment of the announcing machine shown in Fig. 9;

Fig. 14 shows in detail the scanning prism and associated lens system;

Fig. 15 shows schematically the mechanism of a modified embodiment of the announcing machine;

Fig. 16 is a plan view of the assembly of the scanning prisms and associated lens system of Fig. 15; and Fig. 17 is an elevation view of the assembly of scanning prisms and associated lens systems.

General description of the invention

As previously stated the time-of-day announcing system in accordance with the present invention contemplates the establishment of a central bureau at which is positioned an announcing machine which, when demand arises, periodically announces the exact time within the nearest minute. Obviously, if required, such machines could be provided with facilities for announcing the time within closer limits as, for example, to the nearest tenth of a minute. It is intended that the central bureau shall be accessible from a plurality of offices of an exchange area over a special trunk network fanned out from such bureau. To facilitate the inter-connection of subscribers whose lines terminate in exchange offices of an area to be served by the central bureau, with the central bureau the exchanges or offices of the area are divided into sections, all offices of a particular section having access to a local distributing center. From the local distributing centers of a plurality of sections trunks extend as schematically disclosed in Fig. 11 to an outgoing distributing point located contiguous to the central bureau at which bureau the trunks incoming to the outgoing distributing point are connected to the transmission circuit at the central bureau.

While the invention has been disclosed as applied to a system in which all sections of the area may be served directly from the outgoing distributing point it will be obvious that intermediate distributing centers may be interposed between the local distributing centers and the outgoing distributing point as disclosed in detail in the copending application of R. F. Massonneau Serial No. 508,209, filed Jan. 12, 1931. Intermediate distributing centers would probably be employed in a commercial installation but have not been disclosed herein in order to simplify the disclosure as much as possible.

Figure 1:
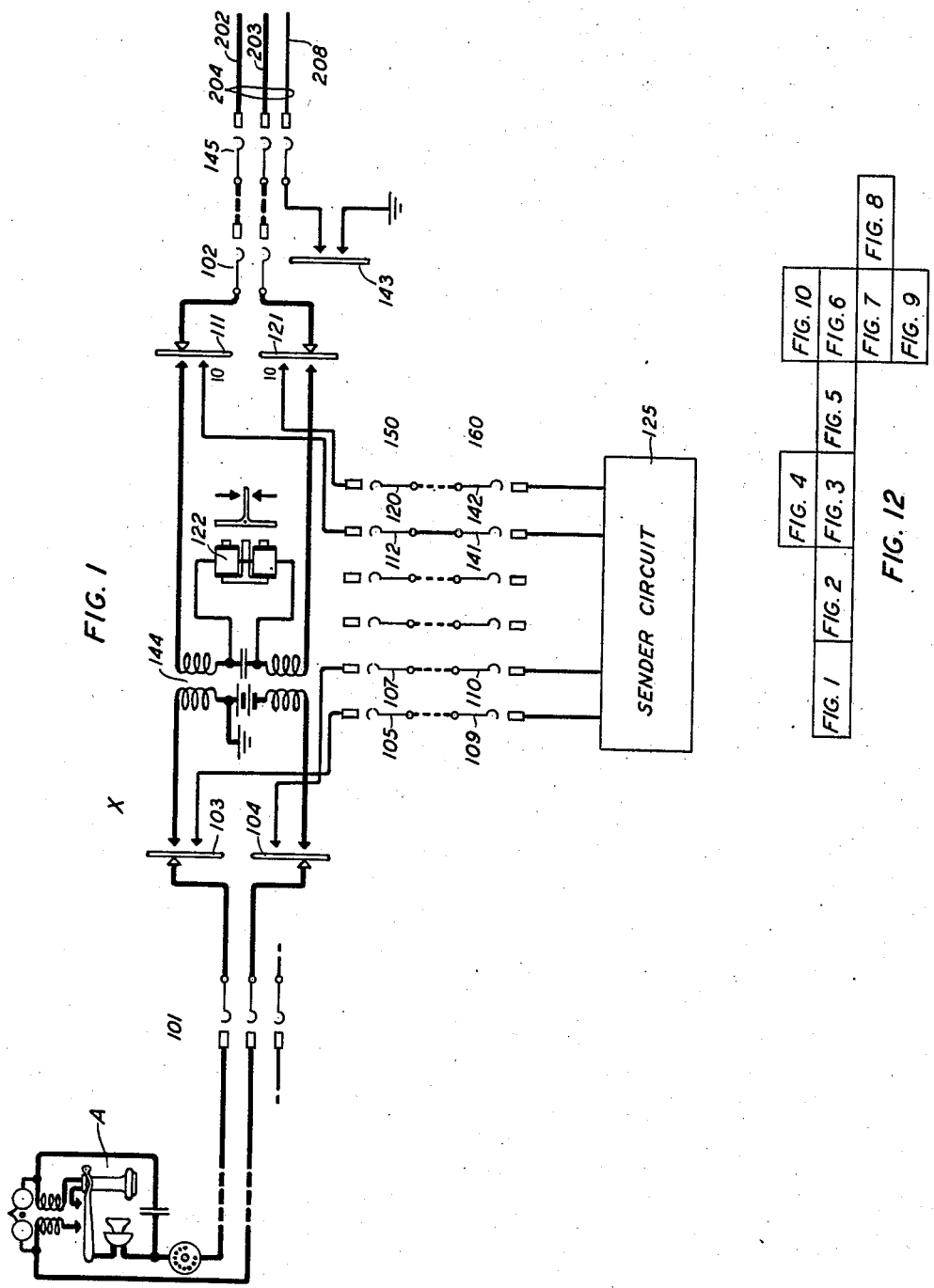

The apparatus at the originating office shown in Fig. 1 is of the well known panel type. The line finder 101, selector switches 102 and 145, and the link circuit of Fig. 1 may be of the same type and function in the same manner as the similar apparatus disclosed and described in Patent No. 1,690,206 issued to A. Raynsford on November 6, 1928. The sender may be of the same type as disclosed in Patent No. 1,505,171 issued to F. A. Stearn, August 19, 1924. Only such portions of these switches, link circuit and sender having been disclosed herein as are considered necessary to an understanding of the invention, reference being made herein to the above identified patents for a full detailed disclosure.

Figure 3:
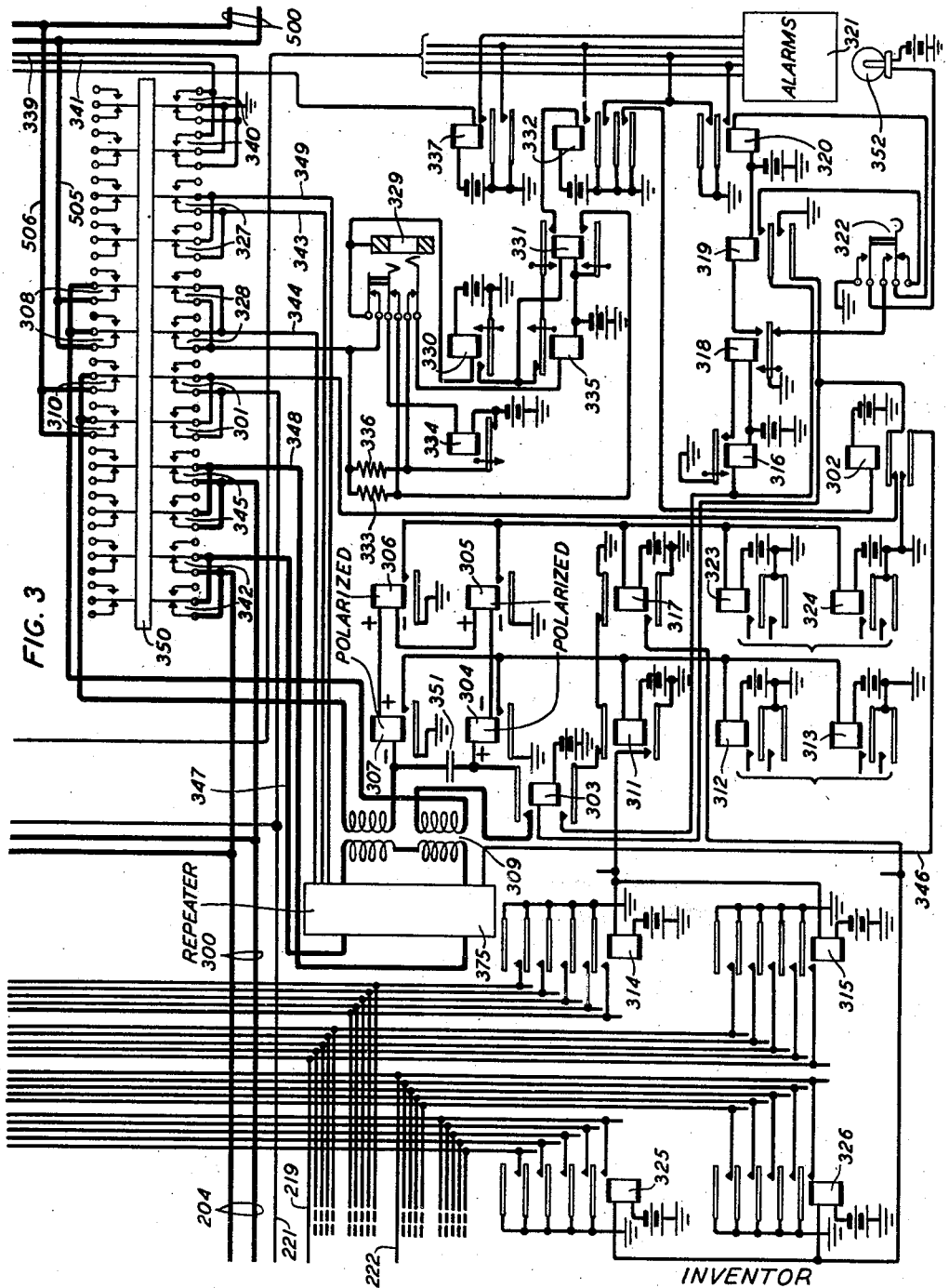

The repeaters 375 and 675 shown diagrammatically by the rectangles in Figs. 3 and 6 may be of the same type as disclosed in detail in Figs. 3 and 12 of the application of R. F. Massonneau above referred to. The repeater alarm circuit indicated by the small rectangle 676 in the lower central portion of Fig. 6 may likewise be the same as the repeater alarm circuit shown in the Massonneau application.

In Fig. 3 the trunks outgoing from bank terminals of selectors such as 145 of the dial switching office X are shown multipled together and connected at the local distributing center in the section of the area in which the office X is located to a trunk 300 in which either the repeater 375 or the alternate repeater 400 may be inserted by the operation of either switch 350 or switch 450. Other offices similar to office X may also have outgoing trunks terminating in the local distributing center and multipled to trunk 300. The repeaters 375 and 400 are arranged to transmit voice currents in one direction only, that is, from the central bureau toward the calling lines in offices such as X. From the input side of repeaters 375 and 400 a trunk 500 extends to the outgoing distributing point Fig. 5. This trunk is also multipled as indicated at the right of Fig. 5 to similar trunks which extend to other local distributing centers such as are shown in Figs. 3 and 4 and the extension of these trunks extends to the central bureau transmission circuit 600 through contacts of key 650. An alternate transmission circuit 1000 may be connected to the extended trunk circuit in place of transmission circuit 600 by the operation of key 1050 to the right and the operation of key 650 to the left. Whenever a transmission circuit is removed from service by the maintenance operator through the operation of the associated keys 650 or 1050 it becomes connected to test line 652 or test line 1052 extending to the maintenance operator's test position. A testing receiver 602 may be connected to either transmission circuit by a plug and jack connection.

Figure 9:
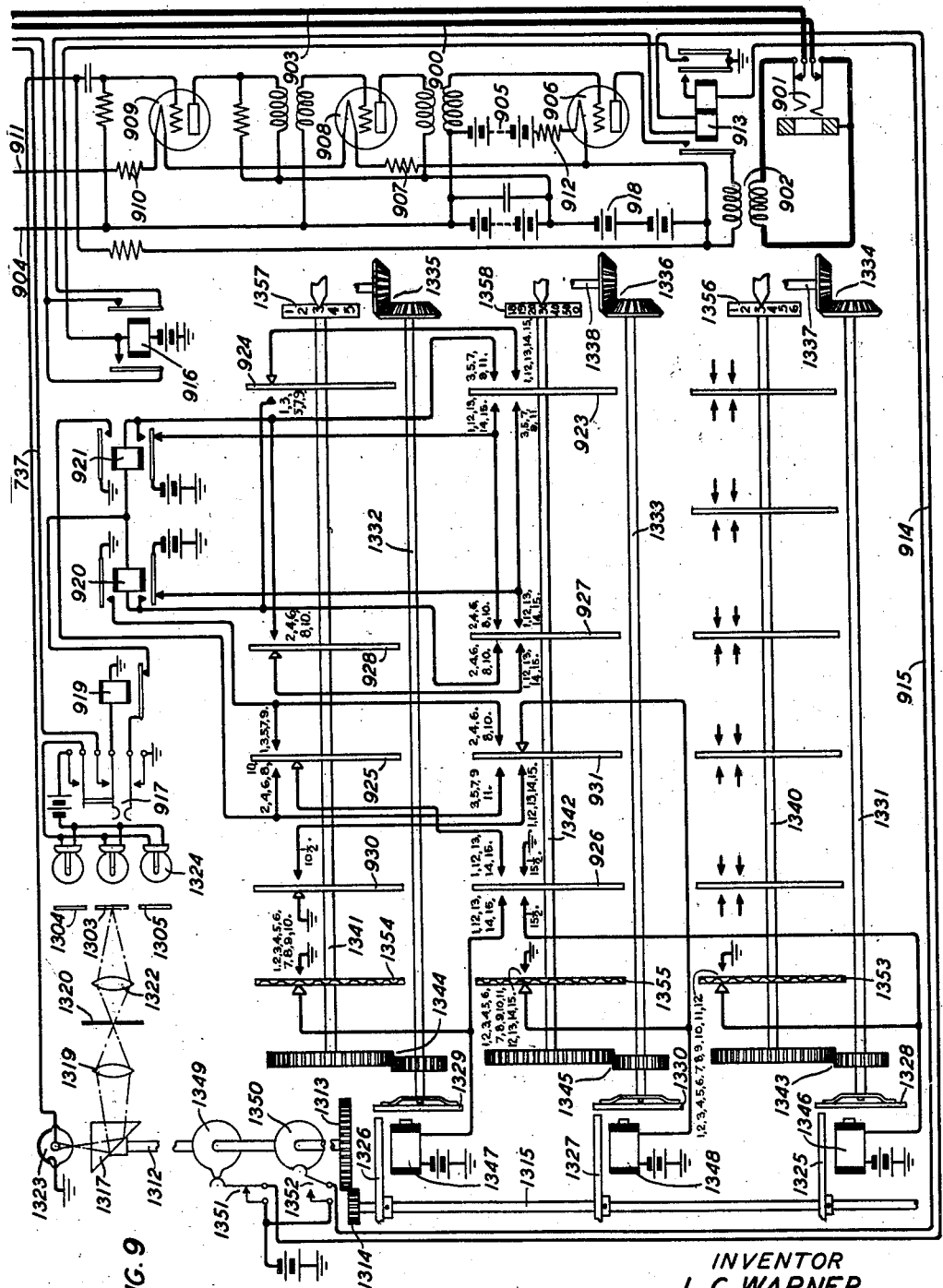

The time announcing machine shown in Figs. 9, 13 and 14 has a circular guide or film track 1300 having three windows 1301 therein spaced 120° apart and flanges 1302 for guiding the films 1303, 1304 and 1305 upon the track. Each of the three films is of the type used in sound pictures provided along either edge with sprocket holes and along the center line thereof with photographic sound traces. The films 1303 and 1305 are guided into and away from arcuate portions of the film track 1300 by sprocket wheels 1306 and are advanced by driving sprocket wheels 1307 and the film 1304 is guided into and away from an arcuate portion of the film track 1300 by the sprocket wheel 1306 and the driving sprocket wheel 1307, the sprocket wheel 1308 serving to take up the slack in the film 1304. Between the windows 1301 in the film track, the track is provided with opaque portions 1309 for the purpose of masking the film, these opaque portions or masks being terminated obliquely as at 1310 and 1311 for the purpose of fading in and out the exposed sound traces.

Positioned in the axis of the film track 1300 is a shaft 1312 driven at a constant speed through gears 1313 and 1314 from a source of power such as an electric motor connected to the power shaft 1315. The shaft 1312 has secured to the upper end thereof a carrier 1316 in which is mounted a prism 1317 and to which is attached a lens tube 1318. Mounted within the lens tube 1318 is a fixed condensing lens 1319, an optical slit 1320 and in the outer end thereof an adjustable telescopic lens tube 1321 carrying an object lens 1322. Positioned in alignment with the axis of shaft 1312 is a photoelectric cell 1323. The axis of the lens system comprising lenses 1319 and 1322 is so positioned with respect to the prism 1317 and the photoelectric cell 1323 that an image of the optical slit 1320 is focused upon the anode of the cell 1323. The portions of films 1303, 1304 and 1305 which are exposed to the scanner through windows 1301 are illuminated by lamps 1324.

The power shaft 1315 is provided with three driving discs 1325, 1326 and 1327 which form portions of magnetic clutches of the type disclosed in the Patent No. 1,127,808 granted February 9, 1915 to Reynolds and Baldwin. The driven discs 1328, 1329 and 1330 of these clutches are secured to shafts 1331, 1332 and 1333 respectively which through bevel gears 1334, 1335 and 1336 drive the shafts 1337, 1339 and 1338 upon which are mounted the sprocket wheels 1307. The shafts 1331, 1332 and 1333 drive auxiliary sequence switch shafts 1340, 1341 and 1342 respectively through reducing gearings 1343, 1344 and 1345. Each sequence switch shaft is provided with contact cams as illustrated schematically in Fig. 9. Each magnetic clutch in addition to a driving disc such as 1325 and a driven disc such as 1328 also comprises a clutch magnet. These clutch magnets are shown at 1346, 1347 and 1348.

The scanner shaft 1312 is also provided with two interrupter cams 1349 and 1350, the cam 1349 being so positioned on the shaft 1312 that it closes the contacts 1351 only when the lens tube 1318 is in a position to begin scanning the exposed portion of film 1303. The cam 1350 is arranged to close contact 1352 during the portion of the revolution of shaft 1312 when the cam 1349 has opened contact 1351.

Referring to Fig. 9 the sequence switch shafts 1340, 1341 and 1342 are provided with master cams 1353, 1354 and 1355 respectively which open their right contacts only in the positions indicated by the numerals adjacent to such contacts for insuring that the shaft when clutched to the power shaft 1315 will be rotated to the positions indicated. The remaining cams on these shafts, such for example as cam 927, close their respective contacts only in the rotary position of the respective shafts indicated by the numerals adjacent to such contacts. Sequence switch shaft 1340 has twelve stop positions per revolution. Shaft 1341 has ten stop positions per revolution and shaft 1342 has fifteen stop positions per revolution. The sequence switch shafts are also each provided with an indicating disc such as 1356, 1357 and 1358 for enabling the maintenance operator to set the shafts initially to agree with the correct time indicated by the master clock shown at 707 in Fig. 7.

The modified form of announcing machine shown in Fig. 15, 16 and 17 has four accurate guides or film tracks, each track extending approximately over an arc of 90° and each having a window 1501 therein and flanges 1502 for guiding films therein, the upper track having a stationary film positioned back of the window thereof. Each of the films is of the type used in sound pictures having a photographic sound trace thereon and the three movable films 1503, 1504 and 1505 being also provided along each edge with sprocket holes. The movable films are guided into and away from the film tracks by means of sprocket wheels 1506 and are advanced by driving sprocket wheels 1507. Between the window 1501 of each film track and either end thereof are masks 1509 for the purpose of masking the films.

Positioned in the axis of the film tracks is a shaft 1512 driven at a constant speed through gears 1513 and 1514 from a source of power connected to the power shaft 1515. The shaft 1512 has secured to the upper end thereof four carriers 1516 in each of which is mounted a prism 1517 and to each of which is attached a lens tube 1518. Mounted within each lens tube is an optical slit and a condensing lens such as are shown at 1320 and 1319 in Fig. 13 and in the outer end of said tube an adjustable telescoping lens tube 1521 carrying an object lens such as is shown at 1322 in Fig. 13. The four carriers and attached prisms and lens tubes are so positioned at 90° angles about the shaft 1512 that as the shaft rotates in a clockwise direction from the position shown in Fig. 15 through a complete revolution, flashes of light from the light sources 1524 will be successively transmitted through the portions of the films exposed through the windows 1501, beginning with the top film and ending with the lower film, through the optical system comprising the prism and associated lens tube to the photoelectric cell 1523 which is positioned in alignment with the axis of shaft 1512. The power shaft 1515 is provided with driving discs 1525, 1526 and 1527 which form portions of magnetic clutches similar to the clutches shown in Fig. 13 which in the manner described in connection with Fig. 13 drive the driving sprockets 1507 and the sequence switch shafts 1540, 1541 and 1542. For convenience similar parts in Figs. 13 and 15 have been similarly numbered except for the first two digits of these numbers which correspond to the number of the corresponding figure designation of the drawings. Cams 1549 and 1550 and their associated contacts likewise correspond to the similar cams 1349 and 1350 of Fig. 13 and perform the same function. The cams carried by the sequence switch shafts 1540, 1541 and 1542 likewise control the circuits shown in Fig. 9 in the same manner as will be hereinafter described in connection with Figs. 9 and 13.

The stepping switch shown in the lower left portion of Fig. 7 is of the well known type, the magnet 719 advancing the wiper 720 one step upon each deenergization of the magnet 719.

*Initiation of a call*

With this general outline of the purpose of the invention and of the apparatus employed in mind the invention will now be considered in more detail. Assume that a subscriber A whose line terminates in office X initiates a call to obtain the correct time. The subscriber A upon removing his receiver from the switchhook causes the setting of the brushes of the line finder 101 upon the terminals of the calling line and the extension of circuits from the calling line and district selector 102 over wipers of the link circuit line finder selector 150 and sender selector 160 to an idle sender 125. It will be further assumed that the sender shown in the lower portion of Fig. 1 is idle and becomes associated with the calling line whereupon a pulsing circuit is established in the well known manner from the pulsing relay of sender 125, wiper 110, wiper 107, the upper right contact of cam 104, the lower brush of line finder 101 over the subscriber's line loop returning over the upper brush of line finder 101, the lower contact of cam 103, wiper 105, wiper 109 to ground at the sender. As soon as this pulsing circuit is established the calling subscriber receives the usual dial tone and proceeds to dial the digits of the central time bureau designation which, it will be assumed, is ME7—4000 thereby setting the registers of the sender to record the office and line designation of the central time bureau.

As soon as the idle sender becomes associated with the district selector the sequence switch associated with the district selector 102 advances to position 3 establishing the usual fundamental circuit from the control relay, not shown, at the selector 102 through the winding of the sender stepping relay. Under the control of the office code registers of the sender, the district selector 102 is controlled in the well known manner to select a trunk group extending to office selectors. Following the selection of the proper trunk group the district selector 102 functions to select an idle office selector in the group such as the one indicated at 145. As soon as the district selector terminates its trunk hunting operation the selector switch associated therewith advances in the well known manner to position 10 whereby a fundamental circuit is established over the conductors of the selected trunk for controlling the office selector 145.

This fundamental circuit may be traced in part from battery through the winding of the control relay, not shown, of the office selector 145, upper brush of switch 102, lower contact of cam 111, wiper 112, wiper 141, winding of the sender stepping relay, not shown, wiper 142, wiper 120, upper contact of cam 121, lower brush of selector switch 102 to ground at the office selector. The stepping relay of the sender and the control relay of the office selector 145 operate in this circuit, the office selector being controlled in the well known manner under the control of the sender in its brush and group selection movements to select an idle trunk circuit such as 204 extending to the local distributing center. For calls to the central time bureau the office code registered in the sender sets up a class of call condition in the sender in the same manner as would be the case if a call were to be made to a manual office having call indicator equipment.

Following the seizure of trunk 204 a control circuit is established from the sender through the control relay 205 of the trunk 204 which may be traced from battery through the upper winding of relay 205, upper back contact of relay 207, tip conductor 202 of trunk 204, tip brushes of switches 145 and 102, lower contact of cam 111, wipers 112 and 141, winding of the sender stepping relay, wipers 142 and 120, ring brushes of switches 102 and 145, ring conductor 203 of trunk 204, inner upper back contact of relay 207 to ground through the lower winding of relay 205. Relay 205 energizes in this circuit and upon operating connects ground from cam 143 in the office selector 145 over the sleeve brush of selector 145, sleeve conductor 208 of trunk 204, front contact of relay 205, to the middle spring of the interrupter 210. As soon as interrupter 210 makes its right contact the ground on conductor 208 is extended through the winding of sleeve relay 211 which operates and locks directly to sleeve conductor 208, connects ground at its inner lower front contact to the start conductor 221 and establishes a circuit for the peg count register over its lowermost front contact, the lower back contact of relay 207, the inner lower normal contact of relay 212 to ground at the next to lower front contact of relay 211.

After an interval sufficient to permit the sender to make the usual trunk guard test and to permit the operation of the peg count register, interrupter 210 closes its left contact establishing a circuit for relay 207 from battery through the upper winding of relay 207, the lower back contact of relay 206, the upper front contact of relay 211, left contact of interrupter 210 to ground on conductor 208. Relay 207 upon operating locks over its upper winding, the lower back contact of relay 206, the lower front contact of relay 207 to ground at the next to inner lower front contact of relay 211, opens the circuit of the peg count register, disconnects the windings of relay 205 from the tip and ring conductors of trunk 204 and connects these conductors in a dry bridge including the winding of polarized relay 225. This circuit may be traced from the tip conductor 202 of trunk 204, upper front contact of relay 207, upper back contact of relay 212, winding of polarized relay 225, inner upper back contact of relay 212, inner upper front contact of relay 207 to ring conductor 203 of trunk 204.

Figure 2:
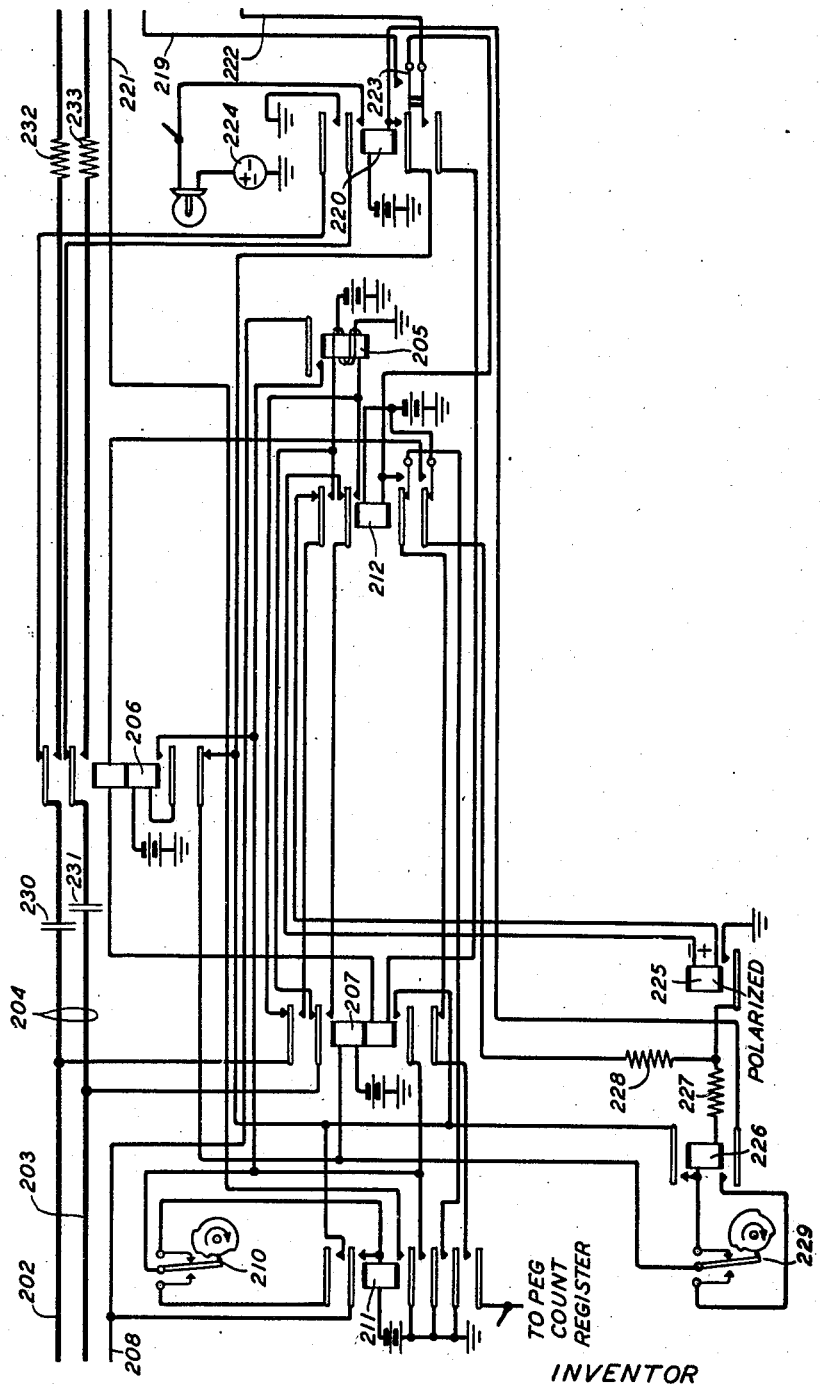

Relay 205 releases without affecting the circuits now established and at the sender a circuit is established as fully set forth in the patent to F. A. Stearn through the magnet winding of the code impulser switch of the sender for advancing the impulser switch out of position 1 through a single revolution. As it passes through a complete revolution the impulser switch transmits a plurality of series of code impulses to the trunk circuit of Fig. 2 in the well known manner, a series being transmitted for each digit of the central bureau designation 4000.

The circuit over which the code impulses are transmitted may be traced in part from the sender 125 over wipers 141 and 112, then, as previously traced through the winding of polarized relay 225 of trunk 204, returning over wipers 120 and 142 to the sender. The impulses of each series may consist in the usual manner of light positive and light or heavy negative impulses. The polarized relay 225 which is included in the impulsing circuit responds only to the negative impulses.

When the impulser switch of the sender advances transmitting the usual negative impulses of current the polarized relay 225 will respond to each such negative impulse. When relay 207 operated it closed a circuit for relay 226 extending from battery over the lowermost normal contacts of relay 212, resistances 228 and 227, winding of relay 226, right contacts of interrupter 229, lower back contact of relay 206, inner lower front contact of relay 207 to ground at a front contact of relay 211. Relay 226 locks over its upper front contact and the inner lower front contact of relay 207 to ground but is not effective to cause the operation of relay 220 during the transmission of code impulses, because before interrupter 229 advances to close its left contact to complete the circuit of relay 220 over the lower contacts of relay 226, polarized relay 225 will respond to a negative code impulse and shunt relay 226 to cause its release. Thus during the transmission of the code impulses relay 225 in responding to each negative impulse will shunt relay 226 and, since these negative impulses arrive periodically at intervals less than the interval required for interrupter 229 to complete a cycle, relay 226 cannot establish the circuit of relay 220.

Upon the completion of the transmission of the code impulses, however, relay 225 will receive no more negative impulses and will remain deenergized thereby permitting relay 226 to reenergize and remain operated during a complete cycle of interrupter 229, whereupon the circuit of relay 220 will be closed from battery through the winding of relay 220, lower contact of relay 226, left contact of interrupter 229, lower back contact of relay 206, inner lower front contact of relay 207 to ground at a contact of relay 211.

Relay 220 upon operating locks over its inner lower front contact, inner lower front contact of relay 207 to ground and connects ringing tone from the source of ringing current 224 over the inner upper front contact of relay 220, inner upper back contact of relay 206, condenser 231, trunk conductor 203, ring brushes of switches 145 and 102, lower contacts of cam 121, right winding of repeating coil 144, upper contacts of cam 111, brushes of switches 102 and 145, trunk conductor 202, condenser 230, upper back contact of relay 206 to ground at the uppermost front contact of relay 220. Ringing tone current is thereupon induced over the calling line loop through the left windings of repeating coil 144 in an obvious manner as a signal to the calling subscriber that a connection has become extended from his line to the transmission network. Relay 220 at its contact 223 also extends conductor 219 to the winding of pick-up relay 212 and extends conductor 222 over its lower front contact through the lower winding of relay 207 and the upper winding of cut-through relay 206. The circuits over conductors 219 and 222 are closed in a manner hereinafter described.

The sender is advanced to the talking selection position following the transmission of the code impulses in turn advancing the district selector sequence switch to the talking position and itself becoming disconnected from the established connection and restored to normal condition.

It will be recalled that when trunk 204 was first seized relay 211 operated and connected ground to start conductor 221. A start circuit was thus closed from ground on start conductor 221 over normal contacts 301 of switch 350, back contacts of relay 302 to battery through the winding of start relay 303 at the local distributing center. Relay 303 operates and connects the polarized relays 304 to 307 inclusive to the conductors of trunk 500 in series with the windings of relays 501 and 502 at the outgoing distributing point. The circuit thus established may be traced from battery through the lower windings of relays 501 and 502, the lower back contact of relay 503, the lower left winding of repeating coil 504, lower contacts of jack 521, conductor 505 of trunk 500, contacts 308 of switch 350, lower right winding of repeating coil 309, upper contact of relay 303, windings of relay 304 to 307 inclusive, upper right winding of coil 309, contacts 310 of switch 350, conductor 506 of trunk 500, upper contacts of jack 521, upper left winding of repeating coil 504, upper back contact of relay 503 to ground through the upper windings of relays 502 and 501. Relays 304 and 307 are so polarized that they operate in this circuit but relays 305 and 306 being oppositely polarized do not operate. Relays 502 and 503 also operate to perform a function to be described hereinafter. Relays 304 and 307 upon operating establish obvious circuits for relays 311, 312 and 313. It is to be noted in this connection that the start conductor 221 is multipled to all trunk circuits such as 204 extending from the several offices having access to the local distributing center disclosed in Figs. 3 and 4 so that when any subscriber in such offices initiates a call for time-of-day service the start relay 303 will be operated.

Relay 311 upon operating closes obvious circuits for relays 314 and 315. Relays 312 and 313 also close circuits for other relays similar to relays 314 and 315. Since it is possible to operate four relays similar to relays 314 and 315 over each grounded contact of relays 311, 312 and 313, it is possible to thus operate twenty relays and since each relay such as 315, is capable when operated of connecting ground to five conductors, such as 219, the operation of polarized relays 304 and 307 may thus control the grounding of one hundred conductors 219, of one hundred trunks 204. When conductor 219 of trunk 204 is grounded through the operation of relay 315 the circuit of pick-up relay 212 is completed and relay 212 operates and locks from battery through its winding and inner lower alternate contact to ground at the next to lower front contact of relay 211. At its lowermost normal contacts relay 212 opens the circuit of relay 226 and at its lower alternate contacts prepares a circuit for relay 206 which will be described later. With relay 212 operated, battery and ground through the windings of relay 205 are connected in series with the winding of polarized relay 122 in the district selector 102 to operate relay 122 for call charging purposes. Similarly relay 212 of all trunks which have been seized for use by other subscribers in offices connected to the local distributing center are simultaneously operated through the operation of relays 214, 215, etc.

*Operation of line in trouble alarm*

Should the trunk circuit 500 be in trouble so that when the start relay 303 connects the relays 304 to 307 inclusive thereto, relays 304 and 307 do not operate and consequently relay 311 does not operate, a circuit is established for operating slow-to-operate relay 316 in a circuit extending from battery, winding of relay 316, lower contact of relay 303, back contact of relay 311, back contact of relay 317 to ground. Relay 316 operates causing slow-to-operate relay 318 and relays 319 and 320 to operate in turn. Relay 319 connects holding ground to the winding of start relay 303 to hold it operated until the trouble condition is removed and relay 320 grounds conductors extending to the alarm board shown diagrammatically by the rectangle 321. This alarm board may comprise suitable lamps or signal devices for indicating to a maintenance man that a trouble condition exists on the trunk line.

In response to the alarm signals the maintenance man depresses the key 322 thus releasing relay 320 which opens the circuit of the alarm signals and establishes over the upper contact of key 322 a circuit for guard lamp 352. When the trouble condition is removed relay 316 releases, in turn releasing relays 318 and 319. Relay 320 reoperates from ground at the back contact of relay 318 over the lower alternate contacts of key 322 causing the alarm signals to be reoperated. Since the guard lamp 352 is at this time lighted the reoperation of the alarm signals indicates to the maintenance man that the trouble has been cleared whereupon he releases key 322 extinguishing the guard lamp and releasing relay 320.

*Extension of start circuit through the central bureau*

It will now be assumed that the time announcing machine shown in Fig. 9 is in use and has been connected to the transmission circuit 600 of Fig. 6 by the insertion of plugs 606 and 611 into the jacks 630 and 631 and consequently relay 609 and relay 610 are operated, relay 609 being operated over the make springs of jack 630 and relay 610 being operated in a circuit extending from battery through the right winding of relay 610, sleeves of jack 630 and plug 606, conductor 900, lower contacts of jack 901, lower winding of output transformer 902, upper contacts of jack 901, conductor 903, tip contacts of plug 606 and jack 630, winding of the input transformer (not shown) of repeater 675 to ground through the left winding of relay 610. Relay 610 in turn closes an obvious circuit for relay 612 which in turn closes an obvious circuit for relay 613. Relay 612 upon operating establishes the filament circuit for the repeater 675 extending from battery at the repeater, conductor 657, inner lower contacts of relay 612, conductor 658, filaments of the vacuum tubes of repeater 675 to ground thus lighting the filaments in the manner set forth in the application of R. F. Massonneau above referred to. Relay 612 at its lowermost contacts also closes a filament circuit for the repeater shown at the right of Fig. 9 which may be traced from conductor 678, rings of jack 630 and plug 606, conductor 904 through the filament battery 905, resistance 912, filament of tube 906, resistance 907, filament of tube 908, filament of tube 909, resistance 910, conductor 911, rings of plug 611 and jack 631, conductor 677 to the contacts of relay 612.

Relay 613 upon operating closes an obvious circuit for relay 614, prepares at its lowermost contacts a circuit for repeater alarm device 676 and closes a break in the start conductor 507 at its upper contacts. If the vacuum tubes of repeater 675 have energized properly and cause the flow of space current the alarm circuit prepared by relay 613 will therefore not be closed through the operation of relay 613. Relay 614 upon operating closes an obvious circuit for relay 615 and a circuit for relay 617 extending from battery, winding of relay 617, back contact of relay 616 to ground at the upper contact of relay 614. At its inner lower front contact relay 615 connects battery to the filaments of the vacuum tubes of the volume indicator 642 which may be of the type disclosed in Patent No. 1,523,827 granted January 20, 1925 to E. L. Nelson and at its lower contact closes the filament circuit of the vacuum tubes 801 and 802 of the oscillator circuit 800. This filament circuit may be traced from the filament battery through resistance 803, the filaments of the tubes in series, resistance 804 and 805, conductor 806, contacts of relay 615, conductor 807 to the other terminal of the filament battery.

When relays 501 and 502 at the outgoing distributing point, Fig. 5, operate as previously described a start circuit is established from ground at the contacts of these relays over conductor 507 which is multipled to other start conductors controlled by similar relays 501 and 502 in trunks similar to trunk 500 extending from other local distributing centers such as is shown in Figs. 3 and 4, upper contacts of relay 613, back contacts of relay 619 to battery through the winding of relay 620. Relay 620, which is slow to operate, in turn establishes an obvious circuit for slow-operating relay 621 which in turn operates and connects the winding of relay 622 to the start conductor 507. Relay 622, which is slow to release, in turn closes an obvious circuit for relay 623. Relay 623 connects the start conductor 507 directly to the winding of relay 622, closes an obvious circuit for relay 619 and an obvious circuit for lamp 624. Lamp 624 lights as a signal that a call has been initiated by some calling subscriber or subscribers for time-of-day service. When relay 619 operates it opens the circuit of relay 620 which releases, in turn, releasing relay 621. Relay 621 in turn opens the initial operating circuit of relay 622 but relay 622 is now held operated over the upper contacts of relay 623 so that relays 623 and 622 remain operated so long as there is ground on start conductor 507 indicating that a demand exists somewhere in the area for time-of-day service. The purpose of the slow-to-operate relays 620 and 621 is to prevent a false signal from being given by reason of a momentary operation of relays 501 and 502 which might be caused due to line surges when disconnection takes place. The slow-to-release relay 622 is used to hold relay 623 operated over the period when relays 501 and 502 momentarily release when battery and ground are reversed through their windings as will be hereinafter described.

When relay 619 operates it establishes a circuit from ground over its upper contact, conductor 626, the normal contacts of relay 700 to battery through the winding of relay 701. Relay 701 upon operating prepares a holding circuit for itself and establishes a circuit for relay 702 extending from battery, winding of relay 702, back contact of relay 703, upper back contact of relay 704 to ground at the lower contacts of relay 701. The operation of relay 702 connects ground to conductors 705 and 706 which extend through back contacts of relay 627 to conductors 628 and 629 extending to the outgoing distributing point, conductor 628 extending thence through the windings of relays 508 to 511 inclusive in parallel to battery. Conductor 628 may also extend through the windings of a second group of four similar relays if the area is large enough to require more trunks outgoing from the central bureau than can be served by the four relays 508 to 511 inclusive. Conductor 629 in a similar manner may be extended through the windings of four or eight additional relays similar to relays 508 to 511 inclusive. It will be noted that relays such as 508 and 510 each serve five outgoing trunks such as 500 and consequently as many as forty trunks may be served although it is intended that not more than thirty-six working trunks shall be connected at one time to the transmission circuit of Fig 6, the remaining four trunks being held in reserve for emergency purposes.

*Transmission of cut-through supervisory signal*

When ground is connected to conductor 628 and relays 508 and 509 operate they establish a circuit for relay 503 extending from battery, upper winding of relay 503, lower contacts of key 512, inner back contacts of relays 513 and 514, to ground at the inner front contacts of relays 508 and 509. Relay 503 upon operating in turn extends this operating ground over the front contact of relay 503 to battery through the winding of relay 517. Relay 517 upon operating establishes a holding circuit from ground at its lower contact, through the lower winding of relay 503. When relay 503 operates it disconnects the upper windings of relays 501 and 502 and ground from trunk conductor 506 and the lower windings of relays 501 and 502 and battery from trunk conductor 505 and when relay 517 operates the upper windings of relays 501 and 502 and ground are reconnected to trunk conductor 505 and the lower windings of these relays and battery are connected to trunk conductor 506, thus reversing the direction of current flowing over the conductors of trunk 500. In a similar manner relays 508 to 511 inclusive and other relays connected to conductors 628 and 629 cause a current reversal on other trunks similar to trunk 500.

The reversal of current flowing over trunk 500 now causes the release of polarized relays 304 and 307 and the operation of polarized relays 305 and 306. Relays 304 and 307 upon releasing in turn release relays 311, 312 and 313 which in turn release all relays 314 and 315 which have been operated. Relays 305 and 306 upon operating close obvious circuits for relays 317, 323 and 324. Relay 317 upon operating closes obvious circuits for relays 325 and 326 and relays 323 and 324 also close circuits for other relays similar to relays 325 and 326. Since it is possible to operate four relays similar to relays 325 and 326 over each grounded contact of relays 317, 323 and 324, it is thus possible to operate twenty relays, and since each relay such as 326 is capable when operated of connecting ground to five conductors such as 222 the operation of polarized relays 305 and 306 may thus control the grounding of one hundred conductors 222 of one hundred trunks 204.

When relay 326 operates to connect ground to conductor 222 with relays 212 and 220 operated as previously described, a connection is extended from ground on conductor 222 through the lower front contact of relay 220, lower winding of relay 207, upper winding of cut-through relay 206 and lower alternate contacts of relay 212 to battery. Cut-through relay 206 operates and locks over its lower winding and front contact to ground at a contact of relay 211, disconnects the source of tone current 224 and ground from the calling line and opens at its lower back contact the locking circuit of relay 207. Relay 207, however, is held operated in series with relay 206. The operation of relay 206 also closes the talking conductors of trunk 204 through condensers 230 and 231 and resistances 232 and 233 to trunk 300 of the transmission network thus bridging the calling line A on in parallel with other subscribers' lines which are receiving service at the same time. The calling subscriber A can now hear the announcement but disturbances or cross talk between his line and the network are very largely prevented by condensers 230 and 231 and resistances 232 and 233.

*Operation of clock circuit*

Returning now to the operation which takes place at the central bureau it will be recalled that relay 702 operated to transmit a supervisory impulse for causing all subscribers' lines which have initiated calls for time-of-day service to be cut through to the transmission network. A further consideration of the clock circuit disclosed in Fig. 7 will now be had. The central bureau is provided with a master clock disclosed in the dot and dash rectangle 707 which is synchronized by a district master clock every hour. Impulses sent out by the district master clock operate relay 708 which connects battery to the synchronizing magnet 709 thus keeping the master clock 707 in synchronism with the district master clock. The winding contacts 710 of the master clock are arranged to close every sixty minutes and to remain closed from six to seven seconds to cause the intermittent operation of the winding magnet 711. The magnet may also be operated independently by the winding key 712.

The master clock 707 is arranged to close a circuit for magnet 719 through the normal right contacts of key 714, switch 715, clock contacts 716, to ground. Contacts 716 are closed for a period of 0.5 of a second every seven and one half seconds and thus operate magnet 719 for 0.5 of a second every seven and one half seconds. On the even hour or fifteen minutes past the hour depending on whether the correction of the clock from the district clock is made on the even hour or fifteen minutes past the hour the contacts 717 close and the contacts 716 are lifted off the operating cam of the clock, the magnet 719 at that time operating over the hour contacts 717. Each time that magnet 719 operates and releases it advances the wiper 720 one step and thus upon the receipt of eight impulses from the clock spaced seven and one half seconds apart the wiper 720 will complete a revolution.

When the position of wiper 720 does not correspond with the position of the second hand of the master clock 707 it may be reset by the operation of key 714 to its right or stop position or to its left or step position. If the wiper 720 is behind the master clock, by operating the key to the step position in which it does not lock the magnet 719 will be energized from battery through the winding of the magnet, the right normal contacts of key 714 to ground at the left alternate contacts of the key and will advance the wiper 720 one step corresponding to a seven and one half second interval upon the release of the key. As many operations of the key to the left may be made as may be required to properly synchronize the wiper 720 with the master clock 707. If the wiper 720 is ahead of the master clock the key 714 may be operated to its right or locking position thereby stopping the advance of the wiper until it is in a position corresponding with the second hand of the master clock. Wiper 720 should rest on contact 730 when the master clock indicates the time to be twenty-two and one half seconds before an even minute.

With the wiper 720 resting on the contact 730 and the master clock in a position twenty-two and one half seconds before the next even minute magnet 719 operates and when the clock contacts 716 open, advances wiper 720 to contact 731. Relay 713 now energizes over a circuit from battery, wiper 720, contact 731, winding of relay 713 to ground. Relay 713 closes a circuit extending from battery through resistance 721, winding of relay 722, lower normal contacts of relay 704 to ground at the contacts of relay 713 and from battery through resistance 723, winding of relay 724, normal contacts of relay 704 to ground at the upper contacts of relay 713. Relay 722 operates but relay 724 does not as it is at the time shunted over its lower back contact by ground on the contacts of relay 713. Relay 722 upon operating causes relay 704 to operate over a circuit extending through the winding of relay 704, front contacts of relay 722 to ground at the back contact of relay 725. Relay 704 at its upper back contact opens the circuit of relay 702 which as will be recalled was instrumental in causing current reversals at the outgoing distributing center for causing subscribers' lines to be cut through to the network. At its lower alternate contact relay 704 establishes a holding circuit for relay 722 extending through the winding of relay 722, alternate contacts of relay 704 to ground at the back contact of relay 725.

After an interval of seven and one half seconds the clock again operates and releases magnet 719 to advance the wiper 720 to contact 732 thereby releasing relay 713. Relay 713 upon releasing opens at its upper contact the shunt around the winding of relay 724 whereupon relay 724 operates over the locking circuit of relay 722 and closes an obvious circuit for relay 700 which in turn closes an obvious circuit for relay 703 and closes a locking circuit for relay 701 extending over the upper contacts of relay 701, the upper alternate contacts of relay 700 to ground on start conductor 626. Relay 703 upon operating closes an obvious circuit for relay 726, opens another point in the circuit of relay 702 and closes a circuit for relay 913 which is effective as soon as cam contacts 1351 close, these contacts closing only when the scanning shaft 1312 is in a position to begin scanning the exposed portion of film 1303. This circuit may be traced from ground at the lower contact of relay 701, the upper front contact of relay 704, the upper contact of relay 703, conductor 718, tip contacts of jack 631 and plug 611, conductor 601, back contact of relay 916, left winding of relay 913, conductor 914, contacts 1351 to battery. Just before cam 1349 advances far enough to open contacts 1351, cam 1350 closes contact 1352 thereby closing a holding circuit for relay 913 from ground through the inner right front contact and right winding of relay 913, conductor 915 to battery over contacts 1352. Relay 913 at its outer right front contact also closes the circuit of relay 916 which operates and locks to ground on conductor 601 and opens the initial energizing circuit of relay 913. When the scanner shaft 1312 completes a revolution the cam 1350 permits contacts 1352 to open thereby releasing relay 913. Should ground still be maintained on conductor 601, the initial energizing circuit of relay 913 cannot now be reclosed since it is held open at the right contacts of relay 916, until ground is removed from conductor 601, thus but one announcement of the time through the operation of the scanner shaft 1312 can be made during the time that conductor 601 is grounded.

With the filament circuit of the tubes 906, 908 and 909 closed as before described, when the scanner comprising the lenses 1319 and 1322 and prism 1317 scans the exposed portions of films 1303, 1304 and 1305 in succession, the photoelectric cell 1323 will receive flashes of light in accordance with the sound traces on the exposed portions of the films from the lamps 1324 which have been illuminated through the operation of key 917. The potential from ground through the photoelectric cell 1323 impressed upon the grid of tube 909 will thus be varied in accordance with the sound traces of the films and the amplifier tubes 909, 908 and 907 will thereupon function in the well known manner to impress amplified telephonic current upon the transformer 902 over a path extending in part from the plate of tube 906, left contact of relay 913, upper winding transformer 902 to the plate battery 918. Current is thereby induced into the input transformer of repeater 675 over a circuit extending from the right terminal of the lower winding of transformer 902, upper contacts of jack 901, conductor 903, tips of plug 606 and jack 630, winding of transformer of repeater 675, condenser 639, sleeves of jack 630 and plug 606, conductor 900, lower contacts of jack 901 to the left terminal of the lower winding of transformer 902.

It will be assumed that at this time the films 1303, 1304 and 1305 are so positioned as to expose sound traces of the announcement "twelve fifty-nine", the film 1303 exposing the trace of the hour numeral "twelve", the film 1304 exposing the trace of the number "fifty" and the film 1305 exposing the trace of the numeral "nine". Thus the announcement of the time fifty-nine minutes after twelve o'clock will be impressed telephonically upon the input transformer of repeater 675. The manner in which this announcement is transmitted to the calling lines which are at the time connected to the central bureau over the trunk network will be described hereinafter.

After seven and one half seconds the clock contacts 716 again close establishing the circuit of magnet 719 which energizes and after 0.5 of a second when contacts 716 again open deenergizes to advance wiper 720 from contact 732 to contact 733. With wiper 720 in contact with contact 733, relay 713 again operates closing a shunt around the winding of relay 722 extending from ground at the back contact of relay 725, alternate lower contacts of relay 704, winding of relay 722, lower front contacts of relay 724 to ground at the contacts of relay 713. Relay 722 thereupon releases and closes a circuit for relay 727 extending through the winding of relay 727, lower contact of relay 726, back contact of relay 722, upper contact of relay 701, upper alternate contacts of relay 700 to ground on conductor 626. Relay 722 also connects ground from conductor 626 over the inner contacts of relay 726, conductor 728 to battery through the winding of relay 632 thereby operating relay 632 and also opens the circuit of relay 704 which thereupon releases. The release of relay 704 also disconnects ground from conductor 601 thereby unlocking relay 916.

With relays 727 and 632 operated a tone circuit is established from the oscillator 800 to the talking conductors of the transmission circuit 600 which may be traced from conductor 518, left upper normal contacts of key 650, upper front contacts of relays 617 and 632, conductor 633, upper contacts of relay 727, left windings of repeating coil 729, lower contact of relay 727, conductor 634, lower alternate contacts of relay 632, lower contacts of relay 617, left lower normal contacts of key 650 to trunk conductor 520. From trunk conductors 518 and 520 this circuit is extended to the calling subscriber's line as will be hereinafter described. Tone current is induced from the oscillator circuit 800 through the right windings of repeating coil 729 over conductors 808 and 809. This tone may be heard for checking purposes over a circuit extending from conductor 633, conductor 638, condenser 637, sleeves of jack 607 and plug 604, headset receiver 602, sleeves of plug 605 and jack 608, condenser 636, conductor 635 and conductor 634.

After a further interval of seven and one half seconds clock contacts 716 again close to operate magnet 719 and after 0.5 of a second reopen to deenergize magnet 719 which thereupon advances wiper 720 from contact 733 to segment 734. When wiper 720 leaves contact 733, relay 713 releases in turn releasing relay 724 which has been held operated over the lower normal contacts of relay 704 and the contact of relay 713. Relay 724 upon releasing in turn releases relays 700, 703, 726, 727 and 632. Relay 701 will remain operated if a call still exists for time-of-day service and with relays 704 and 703 released will again close the circuit of relay 702 which will perform the function previously described of causing a cut through of any subscribers' lines which may have initiated calls.

The tone signal is thus applied to the connected calling lines at the time the second hand of the master clock 707 indicates an exact minute. During the next twenty-two and one half seconds the clock contacts 716 cause the magnet 719 to advance the wiper 720 three steps to contact 738. As the wiper 720 passes over segment 734 a circuit is maintained closed for twenty-two and one half seconds extending from battery, wiper 720, segment 734, conductor 736, sleeve contacts of jack 631 and plug 611, conductor 737, middle contacts of key 917 to ground through the winding of relay 919. When the wiper 720 leaves segment 734 the circuit of relay 919 is opened. After a further seven and one half seconds period the wiper 720 is advanced from contact 738 to contact 730 thus completing the operating cycle of wiper 720.

At the time relay 919 is deenergized it will be assumed that sequence switch shaft 1340 is in position 12, sequence switch shaft 1342 in position 15 and sequence switch shaft 1341 in position 10 and that the films 1303, 1304, and 1305 expose sound traces of the time announcement "twelve fifty-nine". When therefore relay 919 deenergizes relay 921 operates over a circuit extending from ground, bottom contacts of key 917, back contact of relay 919, winding of relay 921, contacts of cam 928, lower contacts of cam 927 to battery at the back contact of relay 920. Relay 921 operates and locks to battery over its lower front contact and at its upper contact closes a circuit extending from ground, left contacts of cam 925, upper contacts of cam 926, to battery through the winding of clutch magnet 1347. Magnet 1347 under the control of master cam 1354 thereupon advances sequence switch shaft 1341 from position 10 to position 1 opening its own initial operating circuit and the initial operating circuit of relay 921 and rotating shaft 1332 to advance film 1305 to expose a blank portion thereof.

As the sequence switch shaft 1341 rotates through position 10½ a circuit is established from ground over the contacts of cam 930, lower contacts of cam 931 to battery through the winding of clutch magnet 1348. Magnet 1348 under the control of master cam 1355 advances sequence switch 1342 from position 15 into position 1 and rotates shaft 1333 to cause film 1304 to expose a blank portion thereof. In passing through position 15½ sequence switch cam 926 closes a circuit extending from ground over the lower contacts of cam 926 to battery through the winding of clutch magnet 1346. Magnet 1346 under the control of master cam 1353 advances sequence switch shaft 1340 from position 12 into position 1 and rotates shaft 1331 to cause film 1303 to expose a sound trace for the numeral "one". The three films 1303, 1304 and 1305 have now been positioned to expose sound traces of the time announcement "one" corresponding to the time one o'clock.

After the termination of the time announcement period for one o'clock relay 919 is again operated through the engagement of wiper 720 with segment 734 opening the locking circuit of relay 921, which relay releases. When relay 919 deenergizes after wiper 720 leaves segment 734 a circuit is closed from ground over the lower contacts of key 917, back contacts of relay 919, winding of relay 920, contacts of cam 924, lower right and upper left contacts of cam 923 to battery at the back contact of relay 921. Relay 920 operates and locks over its lower front contact and at its upper contact closes a circuit extending from ground over the upper right and lower contacts of cam 925, upper contacts of cam 926 to battery through the clutch magnet 1347. Magnet 1347 is thereby energized and under the control of master cam 1354 advances the sequence switch shaft 1341 into position 2. As the shaft advances out of position 1 the initial energizing circuit of relay 920 is opened at the lower left contact of cam 924. The advance of shaft 1332 through the operation of magnet 1347 has through the gearing 1335 and shaft 1339 advanced the film 1305 to expose the portion thereof before the window 1302 which has the sound trace of the numeral "one". The other films 1303 and 1304 not having advanced expose the numeral "one" and a blank portion of these films so that the three films are now positioned to cause the transmission of the time announcement "one one" or one minute after one o'clock.

Upon the next energization of relay 919 after the next announcement period the locking circuit of relay 920 is opened and this relay releases. When thereafter the wiper 720 leaves segment 734 relay 919 releases and a circuit is established for relay 921 extending from ground at the back contact of relay 919, winding of relay 921, contacts of cam 928, lower contacts of cam 927 to battery at the back contact of relay 920. Relay 921 operates and locks to battery over its lower front contact and at its upper contact establishes a circuit extending over the left contacts of cam 925, upper contacts of cam 926, to battery through the winding of clutch magnet 1347. Magnet 1347 again operates to advance the shaft 1332 for moving the film 1305 to expose the sound trace of the numeral "two" and to advance the sequence switch shaft 1341 into position 3 under the control of master cam 1354. When the shaft 1341 advances out of position 2 the initial operating circuit of relay 921 is opened. The three films are now positioned to expose sound traces for the time announcement "one two" or two minutes after one o'clock.

In this manner as the clock 707 advances minute by minute relays 920 and 921 are operated in alternation to advance sequence switch shaft 1341 from position to position until when relay 921 energizes with sequence switch shaft 1341 in position 10 the clutch magnet 1347 is operated to advance the shaft 1341 into position 1 and shaft 1332 advances film 1305 thus exposing a blank portion thereof. During the step-by-step advance of shaft 1332, the film 1305 has successively exposed sound traces for the numerals "three" to "nine" inclusive. In passing from position 10 to position 1 cam 930 establishes in position 10½ a circuit extending from ground over the contacts of cam 930, the lower contacts of cam 931 to battery through the winding of clutch magnet 1348, which upon operating under the control of master cam 1355 advances sequence switch shaft 1342 from position 1 to position 2, opening the initial operating circuit of magnet 1348 at the lower left contact of arm 931 and rotating the shaft 1333 to advance the film 1304 thereby exposing the sound trace of the numeral "ten." With sequence switch shaft 1340 still in position 1, sequence switch shaft 1342 in position 2, and sequence switch shaft 1341 in position 1 the three films 1303, 1304 and 1305 are now positioned to expose the sound traces of the time announcement "one ten" corresponding to the time ten minutes after one o'clock.

On the next energization of relay 919 following the announcement period for the time announcement "one ten" the locking circuit of relay 921 is opened and relay 921 releases.

Upon the deenergization of relay 919 relay 920 operates over a circuit extending from ground, back contact of relay 919, winding of relay 920, lower contacts of cam 927 to battery at the back contact of relay 921. Relay 920 locks over its lower front contact and at its upper contact closes a circuit extending from ground, right contacts of cam 931 to battery through the winding of clutch magnet 1348. Magnet 1348 causes shaft 1342 to advance from position 2 to position 3 under the control of master cam 1355 and causes shaft 1333 to advance the film 1304 to expose the sound trace for the numeral "eleven" so that the three films now are in positions to cause the transmission of the time announcement "one eleven." When sequence switch shaft 1342 advances out of position 2 the initial energizing circuit of relay 920 is opened at cam 927 and this relay releases on the next energization of relay 919.

When relay 919 again deenergizes relay 921 operates over a circuit extending from ground at the back contact of relay 919, winding of relay 921, upper right and lower left contacts of cam 923 to battery at the back contact of relay 920, locks over its lower front contact and at its upper contact establishes a circuit from ground, upper left and lower right contacts of cam 931 to battery through the winding of clutch magnet 1348. Magnet 1348 again operates to advance sequence switch shaft 1342 from position 3 to position 4 under the control of master cam 1355 and causes the shaft 1333 to advance the film 1304 to expose the sound trace for the numeral "twelve", so that the three films now are in positions to cause the transmission of the time announcement "one twelve". When sequence switch shaft 1342 advances out of position 3 the initial energizing circuit of relay 921 is opened and this relay releases on the next energization of relay 919. In this manner in response to successive operations of relay 919, relays 920 and 921 operate in alternation to advance sequence switch shaft 1342 from position 4 to position 12 inclusive, the circuit for clutch magnet 1348 being controlled with sequence switch shaft in position 11 by the energization of relay 921 to advance the shaft 1342 into position 12 and to rotate the shaft 1333 to advance film 1304 to expose the sound trace of the numeral "twenty". At this time the three films are positioned to cause the transmission of the announcement "one twenty". As the shaft 1333 was rotated as sequence switch shaft 1342 advanced from position 5 through position 11 the film 1304 successively exposed sound traces of the numerals "thirteen" to "nineteen" inclusive.

When relay 919 again energizes following the announcement period for the time "one twenty" the locking circuit of relay 921 is opened and relay 921 releases. Upon the subsequent deenergization of relay 919 with sequence switch shaft 1341 in position 1 and sequence switch shaft 1342 in position 12 relay 920 operates over a circuit from ground at the back contact of relay 919, winding of relay 920, contacts of cam 924, lower right and upper left contacts of cam 923 to battery at the back contact of relay 921. Relay 920 operates and locks over its lower front contact and closes a circuit from ground at its upper contact, upper right and lower left contacts of cam 925, upper contacts of cam 926 to battery through the winding of clutch magnet 1347. Magnet 1347 under the control of master cam 1354 advances sequence switch 1341 from position 1 into position 2 thereby opening the initial circuit of relay 920 and the initial circuit of magnet 1347 and causes the rotation of shaft 1332 to advance film 1305 to expose the sound trace of the numeral "one". The films are now in positions to cause the transmission of the time announcement "one twenty-one".

On the next energization of relay 919, relay 920 releases. When relay 919 again deenergizes relay 921 operates in a circuit extending from ground at the back contact of relay 919, winding of relay 921, contacts of cam 928, lower contacts of cam 927 to battery at the back contact of relay 920, locks over its lower front contact and at its upper contact closes a circuit extending from ground, left contacts of cam 925, upper contacts of cam 926 to battery through the winding of clutch magnet 1347. Magnet 1347 under the control of master cam 1354 advances sequence switch shaft 1341 from position 2 to position 3 thereby opening the initial circuit of relay 921 and the initial circuit of magnet 1347 and causes the rotation of shaft 1332 to advance film 1305 to expose the sound trace of the numeral "two". The films are now in positions to cause the transmission of the time announcement "one twenty-two". In this manner in response to successive operations of relay 919, relays 920 and 921 are operated in alternation to advance sequence switch shaft 1341 from position to position until when relay 921 energizes with this shaft in position 10 the magnet 1347 is operated to advance shaft 1341 into position 1 and to rotate shaft 1332 for exposing a blank portion of film 1305. During this step-by-step advance of shaft 1332 the film 1305 has successively exposed the sound traces for the numerals "three" to "nine" inclusive.

In passing through position 10½ cam 930 establishes a circuit extending from ground over the contacts of cam 930, the lower contacts of cam 931 to battery through the winding of clutch magnet 1348 which upon operating, under the control of master cam 1355, advances sequence switch shaft 1342 from position 12 into position 13 opening the operating circuit of magnet 1348 at the lower contacts of cam 931 and rotating shaft 1333 to advance the film 1304 thereby exposing the sound trace of the numeral "thirty". With sequence switch shaft 1340 still in position 1, sequence switch shaft 1342 in position 13 and sequence switch shaft 1341 in position 1 the three films are now positioned to expose the sound traces of the time announcement "one thirty".

On the next energization of relay 919 following the announcement period for the time "one thirty" relay 921 deenergizes. When relay 919 again energizes relay 920 operates in a circuit extending from ground at the back contact of relay 919, winding of relay 920, contacts of cam 924, lower right and upper left contacts of cam 923 to battery at the back contacts of relay 921, locks over its lower front contact and at its upper contact closes a circuit from ground, right and lower contacts of cam 925, upper contacts of cam 926 to battery through the winding of clutch magnet 1347. Magnet 1347 under the control of master cam 1354 advances sequence switch shaft 1341 from position 1 into position 2 thereby opening the initial circuit of relay 920 and the initial circuit of magnet 1347 and causing the rotation of shaft 1332 to advance film 1305 to expose the sound trace for the numeral "one". The films are now in positions to cause the transmission of the time announcement "one thirty-one".

On the next energization of relay 919, relay 920 releases. When relay 919 again deenergizes relay 921 operates in a circuit extending from ground at the back contact of relay 919, winding of relay 921, contacts of cam 928, lower contacts of cam 927 to battery at the back contact of relay 920, locks over its lower front contact and at its upper contact closes a circuit extending from ground, left contacts of cam 925, upper contacts of cam 926 to battery through the winding of clutch magnet 1347. Magnet 1347 under the control of master cam 1354 advances sequence switch shaft 1341 from position 2 to position 3 thereby opening the initial circuit of relay 921 and the initial circuit of magnet 1347 and causing the rotation of shaft 1332 to advance film 1305 to expose the sound trace of the numeral "two". The films are now in positions to cause the transmission of the time announcement "one thirty-two". In this manner in response to successive operations of relay 919, relays 920 and 921 are operated in alternation to advance sequence switch shaft 1341 from position to position until when relay 921 energizes with the shaft in position 10 the clutch magnet 1347 is operated to advance shaft 1341 into position 1 thus exposing a blank portion of film 1305. During this step-by-step advance the shaft 1332 moves the film 1305 to successively display the sound traces for the numerals "three" to "nine" inclusive. In passing through position 10½ cam 930 establishes the previously traced circuit for clutch magnet 1348 which upon operating advances sequence switch shaft 1342 from position 13 into position 14 and moves the film 1304 thereby exposing the sound trace of the numeral "forty". With sequence switch shaft 1340 still in position 1, sequence switch shaft 1342 in position 14 and sequence switch shaft 1341 in position 1 sound traces of the time announcement "one forty" are exposed.

On the next energization of relay 919 following the announcement period for the time "one forty" relay 921 deenergizes. When relay 919 again deenergizes relay 920 operates in a circuit extending from ground at the back contact of relay 919, winding of relay 920, contacts of cam 924, lower right and upper left contacts of cam 923 to battery at the back contact of relay 921, locks and at its upper contact prepares the previously traced circuit for magnet 1347. Magnet 1347 thereupon advances sequence switch shaft 1341 from position 1 to position 2 and rotates shaft 1332 to advance film 1305 to expose the sound trace for the numeral "one". The films are now in positions to cause the transmission of the time announcement "one forty-one".

On the next energization of relay 919 relay 920 releases. When relay 919 again deenergizes relay 921 operates in a circuit extending from ground at the back contact of relay 919, winding of relay 921, contacts of cam 928, lower contacts of cam 927 to battery at the back contact of relay 920, locks and at its upper contact closes the previously traced circuit for clutch magnet 1347. Magnet 1347 thereupon advances sequence switch shaft 1341 from position 2 to position 3 and rotates shaft 1332 to advance film 1305 to expose the sound trace for the numeral "two." The films are now in positions to cause the transmission of the time announcement "one forty-two." In this manner in response to successive operations of relay 919 relays 920 and 921 are operated in alternation to advance sequence switch shaft 1341 from position to position until when relay 921 energizes with this shaft in position 10 magnet 1347 is operated to advance shaft 1341 into position 1, and to advance shaft 1332 for exposing a blank portion of film 1305. During this step-by-step advance of shaft 1332 the film 1305 has successively displayed the sound traces for the numerals " three " to " nine " inclusive. In passing from position 10 into position 1 cam 930 establishes the previously traced circuit for clutch magnet 1348 which upon operating advances sequence switch shaft 1342 from position 14 into position 15 and advances the film 1304 thereby exposing the sound trace of the numeral " fifty." With sequence switch shaft 1340 still in position 1, sequence switch shaft 1342 in position 15 and sequence switch shaft 1341 in position 1 the three films are now positioned to expose the sound traces of the time announcement "one fifty."

On the next energization of relay 919 following the announcement period for the time "one fifty" relay 921 deenergizes. When relay 919 again deenergizes, relay 920 operates in a circuit extending from ground at the back contact of relay 919, winding of relay 920, contacts of cam 924, lower right and upper left contacts of cam 923 to battery at the back contact of relay 921, locks and at its upper contact prepares the previously traced circuit for magnet 1347. Magnet 1347 thereupon advances sequence switch shaft 1341 from position 1 to position 2 and rotates shaft 1332 to advance film 1305 to expose the sound trace for the numeral "one." The films are now in positions to cause the transmission of the time announcement "one fifty-one."

On the next energization of relay 919, relay 920 releases. When relay 919 again deenergizes relay 921 operates in a circuit extending from ground at the back contact or relay 919, winding of relay 921, contacts of cam 928, lower contacts of cam 927 to battery at the back contact of relay 920, locks, and at its upper contact prepares the previously traced circuit for magnet 1347. Magnet 1347 thereupon advances sequence switch shaft 1341 from position 2 to position 3 and rotates shaft 1332 to advance film 1305 to expose the sound trace of the numeral "two." The films are now in positions to cause the transmission of the time announcement "one fifty-two." In this manner in response to successive operations of relay 919, relays 920 and 921 are operated in alternation to advance sequence switch shaft 1341 from position to position until when relay 921 energizes with this shaft in position 10 magnet 1347 is operated to advance shaft 1341 into position 1. The shaft 1332 is at this time rotated to advance film 1305 to expose a blank portion thereof. During this step-by-step advance of shaft 1332 the film 1305 has successively displayed the sound traces for the numerals "three" to "nine" inclusive. In passing through position 10½ cam 930 establishes the previously traced circuit for clutch magnet 1348 which upon operating advances sequence switch shaft 1342 from position 15 into position 1 and advances film 1304 thereby exposing a blank portion thereof.

As sequence switch shaft 1342 advances through position 15½ a circuit is established from ground over the lower contacts of cam 926 to battery through the winding of clutch magnet 1346. Magnet 1346 under the control of master cam 1353 advances sequence switch shaft 1340 from position 1 into position 2 and rotates shaft 1331 to advance film 1303 whereby the sound trace of the hour numeral "two" is exposed. With sequence switch shaft 1340 in position 2, sequence switch shaft 1342 in position 1 and sequence switch shaft 1341 in position 1 the three films are now positioned to expose the sound traces of the time announcement "two", indicating the time two o'clock.

In the manner previously described the sequence switch shafts 1340, 1341 and 1342 are advanced through the operation and release of relay 919 under the control of the master clock during each hour of the day so that just prior to each minute announcement period the films will expose sound traces corresponding to the correct hour and minute of the day.

If the three films at any time expose a time announcement which does not correspond with the correct time indicated by the master clock the film may be advanced manually to expose the correct sound traces, for example, if the master clock indicates that the correct time is thirty-three minutes after three o'clock, the films should be advanced until the index wheel 1356 on sequence switch shaft 1340 is in a position with the numeral three opposite the associated pointer, until the index wheel 1358 on the sequence switch shaft 1342 is in a position with the numeral thirty opposite the associated pointer and until the index wheel 1357 on the sequence switch shaft 1341 is in a position with the numeral three opposite the associated pointer.

At the beginning of the announcement period relay 700 is operated as previously described. In the event that there is no call waiting at this time relay 701 will not be operated and consequently ground will not be connected to operate announcement relay 913. If a call waiting condition arises after relay 700 operates ground is connected to conductor 626 but relay 701 cannot then operate as it is disconnected from conductor 626 at the uppermost contact of relay 700. After the start of the announcement period relay 700 releases as previously described causing relay 702 to operate. At the beginning of the next announcement period relay 913 will operate as previously described. This arrangement insures that there will always be sufficient time to make a complete announcement. When there is no call waiting and therefore no ground on conductor 626 relays 713, 722, 724, 704, 700, 703 and 726 operate in the manner previously described but relays 701, 702, 727 and 632 do not operate. In order to have the clock circuit of Fig. 7 synchronized to start the announcement period by operating relay 913 seven and one half seconds before the minute it is necessary to operate relay 722 with relay 724 short-circuited. This condition may be obtained without disturbing the position of wiper 720 with respect to contact 731 by operating the key 739 to operate relay 725. Relay 725 upon operating removes the operating ground from relay 704. When the key is restored relay 725 releases.

Operation of repeater at local distributing center

It will be assumed that the switch 350 at the local distributing center and key 650 at the transmission circuit are both in their normal positions. With switch 350 normal filament battery is connected to the filaments of the tubes of repeater 375 from battery at the repeater over conductor 349, normal contacts 327 of switch 350, conductor 343 through the two filaments to ground in the manner described in the application of R. F. Massonneau hereinbefore referred to. If the tubes are properly energized and emit space current a plate circuit relay (not shown) in the repeater will operate. If, however, the filaments do not light or the tubes do not emit space current this relay will not operate and a circuit is therefore closed from ground at the back contact of this relay over conductor 344, contacts 328 of switch 350, upper normal contacts of jack 329 to battery through the winding of slow-to-operate relay 330 and through resistance 333 and the inner normal contacts of jack 329 through the winding of slow-to-release relay 334. Relay 334 operates first and removes a short circuit from relay 335 extending from battery through the winding of relay 335, lower normal contacts of jack 329, to battery at the back contact of relay 334, thus permitting relay 335 to operate over the lower normal contacts of jack 329, resistance 336 to grounded conductor 344. Relay 335 upon operating opens the operating circuit of relay 332. When relay 330 operates it causes the operation of relay 331 which is also a slow-to-operate relay. As soon as relay 331 operates it closes a short circuit around the winding of slow-to-release relay 334 which after an interval again short-circuits relay 335 causing it to release. With relay 335 released and relay 331 operated relay 332 operates and causes the operation of relay 302 and the closure of circuits for alarm signals on the alarm board 321. The operation of relay 302 opens the start circuit extending to the winding of relay 303 whereupon if calls come in to the local distributing center they will not be extended until the trouble condition is removed. Relay 302 also closes the circuit of a trouble lamp not shown on the repeater panel over conductor 346. The group of slow-to-operate and slow-to-release relays 330, 331, 334 and 335 provide a sufficient delay before the operation of alarm signals to permit the tubes of the repeater 375 to become heated up when the repeater is placed in service.

If the trouble lamp lights, the maintenance operator, by throwing switch 350 to the right, can remove the circuits of Fig. 3 from service. He then throws switch 450 of the alternate equipment, Fig. 4, to the left. A repeater similar to repeater 375 and supervisory and alarm equipment similar to that shown in Fig. 3 which is diagrammatically indicated in Fig. 4 by the rectangle 400 is then inserted between trunks 300 and trunk 500. In this connection it should be noted that switches 350 and 450 should not be operated in the same direction at one time. If both switches should through error be in the position in which switch 350 is shown, that is thrown to the left, a circuit will be established from battery, winding of relay 337, contacts 438 of switch 450, conductor 339, contacts 338 of switch 350 to ground. Relay 337 will then operate closing alarm signals at the alarm board 321. Similarly if both switches 350 and 450 should be thrown to the right the circuit of relay 337 will be completed from battery through the winding of relay 337, contacts 440 of switch 450, conductor 341, contacts 340 of switch 350 to ground. The maintenance operator noting the alarm signals will then throw the switches properly so that one and only one repeater circuit will be in service.

Transmission of announcement time

Assuming that at the time the announcement relay 913 is operated to make a time announcement the repeater circuits of Figs. 3 and 6 are functioning properly and have been placed in service through the proper operation of switch 350 and key 650 as previously described, voice current will be transmitted from the announcing machine through the input transformer or repeater 675 over the circuit previously described. The current induced into the repeater 675 is then amplified in the well known manner by tubes of the repeater and impressed by the output transformer thereof upon a loop circuit over the lower normal contacts of relay 632, lower contacts of relay 617, lower left normal contacts of key 650, conductor 520, normal contacts of key 512 through the right windings of repeating coil 504, upper normal contacts of key 512, conductor 518, left upper normal contacts of key 650, upper contacts of relay 617, upper normal contacts of relay 632 to the output transformer of repeater 675.

Current is again impressed by repeating coil 504 upon a loop circuit extending from the upper left terminal of this coil, upper contacts of jack 521, trunk conductor 506, switch contacts 310, upper right winding of repeating coil 309, condenser 351, upper contact of relay 303, lower right winding of repeating coil 309, switch contacts 308, trunk conductor 505, lower contacts of jack 521, lower left winding of repeating coil 504, lower back contact of relay 503, condenser 522, upper back contact of relay 503 to the upper left winding of repeating coil 504. The current thus impressed on the right windings of repeating coil 309 is in turn impressed over the left windings of coil 309 and the winding of the input transformer of repeater 375. Repeater 375 amplifies the current thus impressed on its input transformer and, through its output transformer impresses it over a loop circuit extending from the windings of its output transformer over conductor 347, switch contacts 342, resistance 232, upper contact of relay 206, condenser 230, tip brushes of selectors 145 and 102, right windings of repeating coil 144, thence over ring brushes of selectors 102 and 145, condenser 231, inner upper front contact of relay 206, resistance 233, switch contacts 345, conductor 348 to the windings of the output transformer of repeater 375. The calling subscriber on line A is enabled to hear the announcement by currents induced upon his line over the left windings of repeating coil 144.

At the same time other subscribers' lines which may at the instant be connected to the network also receive the announcement over branches of the circuits above traced extending from conductors 518 and 520 at the outgoing distributing point of Fig. 5 and from conductors branched from trunk 300 at the local distributing center of Fig. 3. After the announcement has been made and relay 632 has operated as previously described a tone signal is applied over the network from the oscillation 800 of Fig. 8 in the manner just described for the transmission of voice current.

Immediately following the completion of the announcement period current flowing over the loop supervisory circuit of the trunk network is again reversed by the clock circuit so that relay 326 at the local distributing center releases following the release of relay 702 at the clock circuit and opens the operating circuit of relays 206 and 207. Relay 206 remains locked but relay 207 releases and reverses the direction of current flowing through the supervisory relay 122 and releases relay 220. The purpose of reversing the current at this time is to prevent the calling subscriber from being charged for more than one call. The calling subscriber may now listen to more than one time announcement if he so desires.

Restoration of the connection

When the calling subscriber hangs his receiver upon the switchhook the district and office selectors 102 and 145 and the line finder 101 release in the well known manner, the office selector removing ground at cam 143 from sleeve conductor 208 thereby releasing relay 211. Relay 211 in turn releases relays 212 and 206 and removes ground from start conductor 221. If there are no other calling subscribers' lines at the time connected to the local distributing center start relay 303 thereat will release, thereby releasing relays 501 and 502 which in turn release, opening start conductor 507. If there are no other calls at the time incoming to the outgoing distributing point relays 622, 623 and 619 at the transmission circuit of the central bureau will release to remove start ground from conductor 626.

Alternative distributing circuit

In the previous description it has been pointed out that repeater 375 at the local distributing center may if defective be removed from service by the operation of switch 350 and alternate repeater 400 placed in service by the operation of switch 450. A further safeguard against circuit failure is also provided at the outgoing distributing point whereby a group 523 of supervisory distributing relays, Fig. 5, may be cut out of service and a similar group of relays 527 substituted therefor. Relays corresponding to relays 508 to 511 inclusive and 513 to 516 inclusive of group 523 are not disclosed in detail in Fig. 5 but have been indicated by the rectangle 527. If the maintenance operator for example should find it necessary to remove relays 508 to 511 inclusive from service he will operate key 524 thus operating relays 513 to 516 inclusive, thereby rendering relays 508 to 511 ineffective to control reversing relays, such as 503, of trunks outgoing from the outgoing distributing point to local distributing centers. Key 524 when operated also establishes a circuit over conductor 526, the back contact of relay 647 to battery through the winding of relay 648. Relay 648 operates and lights out-of-service lamps 649 and 651. Relay 627 is also operated from ground on conductor 526 to open the reversing conductors 628 and 629, thus preventing any calls from being connected to the bureau while the transmission circuit 600 is still in service.

In response to the lighting of lamp 651 the plugs 604 and 605 are withdrawn from jacks 607 and 608 and these plugs are connected with jacks 1007 and 1008 of the alternate transmission circuit shown diagrammatically by the rectangle 1000 of Fig. 10, the plugs 606 and 611 are withdrawn from jacks 630 and 631, and the plugs of another announcing machine similar to that shown in Fig. 9 are inserted into jacks 1030 and 1031 of the emergency transmission circuit of Fig. 10. The withdrawal of plugs 606 and 611 causes relays 609 and 610 of the vacated transmission circuit to release, relay 610 causing relay 612 to release to open the filament circuit of the associated repeater 675 and to release relay 613. Relay 613 upon releasing releases relay 614, opens the alarm conductor extending from repeater 675 to the alarm circuit 676 and causes relays 622, 623 and 619 to release in turn. The release of relay 614 opens the circuit of relays 617 and 615 which also release. The release of relay 615 opens the filament circuits of the volume indicator 642 and of the oscillator 800. The release of relay 612 also opens the filament circuit of the repeater of Fig. 9. With the release of relay 623 the lamp 624 is extinguished and starting ground is removed from conductor 626 extending to the clock circuit of Fig. 7. When the operator plugs into the jacks of the alternate transmission circuit 1000 this transmission circuit including an associated clock circuit, repeater circuit, oscillator and volume indicator and repeater alarm circuit functions as previously described in connection with Figs. 6 to 8 inclusive, the alternate announcing machine similar to that shown in Fig. 9 functioning with these circuits in the manner previously described in connection with Fig. 9.

The maintenance operator upon observing the out-of-service lamp 649 lighted operates key 650 to the left thus disconnecting the talking conductors of the transmission circuit 600 from the trunk conductors 518 and 520. With key 650 thrown to the left obvious circuits are closed for relay 647 and relay 653 causing these relays to operate. Relay 647 opens the circuit of relay 648 thereby extinguishing lamps 649 and 651. The maintenance operator then operates key 1050 to the right conecting the trunk conductors 518 and 520 to the transmission circuit 1000. Incoming calls are now directed to the transmission circuit 1000 in the same manner as previously described in connection with transmission circuit 600. In a similar manner if transmission circuit 1000 is in service with the distributing relay set 527 and trouble arises in this relay set the key 525 would be operated performing functions similar to key 524.

*Alternate transmission and associated circuits*

In the event that trouble should be encountered in the repeater 675 associated with the transmission circuit 600 and it fails to emit space current when connected into service and the plate circuit relay of this repeater does not operate a circuit is established from ground at the back contact of this relay, conductor 643, lower contact of relay 613 to relays in the alarm circuit 676 in the manner described in the application of R. F. Massonneau hereinbefore referred to. After a predetermined interval if the trouble condition continues in the repeater 675 alarm signals are operated, a circuit is established over conductor 644 for lighting a trouble lamp on the repeater panel and ground is connected to conductor 666 for operating relays 627 and 648 at the associated transmission circuit 600.

At the transmission circuit 600 upon the operation of relay 627, the supervisory reversing conductors 628 and 629 are opened to prevent any subscriber's line from being cut through to the central bureau and upon the operation of relay 648 the out-of-service lamps 651 and 649 are lighted to inform the maintenance operator that he should transfer from the transmission circuit 600 to the transmission circuit 1000. The maintenance operator upon observing the lighted lamp 649 operates key 650 to the left thus disconnecting the talking conductors of transmission circuit 600 from the trunk conductors 518 and 520 and connecting this transmission circuit with his test line 652 and operates key 1050 to the right to connect the trunk line with the transmission circuit 1000. With key 650 thrown to the left obvious circuits are closed for relays 647 and 653 causing these relays to operate. Relay 647 opens the circuit of relay 648 thereby extinguishing lamps 649 and 651 and closes an obvious circuit for relay 654 which in turn closes an obvious circuit for relay 616. Relay 616 locks over the upper contact of relay 654 to ground at the lower right contact of key 650. Relay 616 upon operating opens the circuit of relay 617 at one point, this circuit being further opened at the contacts of relay 614 as soon as the plugs 606 and 611 are withdrawn from the jacks 630 and 631 of the transmission circuit 600. Relay 617 however reoperates over an obvious circuit closed by relay 653 thus connecting the talking conductors of the transmission circuit over its front contacts and the left contacts of key 650 to the test line 652 for testing purposes. Relay 653 also closes a circuit extending from ground at its lower front contact over the upper front contact of relay 647 to battery through the winding of relay 648 for reoperating relay 648 to relight lamps 649 and 651, these lamps now remaining lighted until the key 650 is restored.

The maintenance operator may now test the vacated channel under operating conditions by having a spare announcing machine plugged into jacks 630 and 631 and a receiver connected to the test line 652. With the spare announcing machine plugged up relays 609, 610, 612, 613, 614, 615, 620, 621, 622, 623, 619 and 632 function as previously described and the maintenance operator will be able to hear regular announcements made through the spare machine and also receive tone from the oscillator 800.

After the maintenance operator has repaired the trouble he will restore the key 650 to normal. When key 650 is restored, relay 653 releases but relay 647 is held operated over a circuit extending through the upper contacts of relay 654 to ground at the upper contact of relay 614. Relay 647 holds relays 654 and 627 operated. When relay 653 releases relay 617 releases since at this time relay 616 is operated, and at its lower back contact relay 653 connects interrupted ground from interrupter 655 over the upper front contacts of relay 647 through the winding of relay 648. Relay 648 is now intermittently operated to flash out-of-service lamps 649 and 651. In response to the flashing of lamp 651 the spare announcing machine is disconnected from jacks 630 and 631 thus releasing relays 609 and 610 which in turn cause the release of relays 612, 613, 614, 615, 622, 623 and 619. Relay 614 upon releasing releases relay 647 which in turn releases relay 648 and extinguishes lamps 649 and 651 and releases relays 654 and 616. The extinguishing of lamp 651 is a signal that the associated transmission circuit is operative. The transmission circuit of Fig. 10 may in a similar manner be removed from service and connected to test line 1052 for testing purposes.

Transmission circuit alarm

Should the transmission circuits be both vacated and a call be incoming, ground on conductor 507 is extended over the normal contacts of jacks 607 and 608, conductor 656, normal contacts of jacks 1007 and 1008 to the winding of relay 1057 or over the back contact of relay 609, conductor 656, back contact of relay 1009 to battery through the winding of relay 1057. Relay 1057 operates closing a circuit for audible signal 1058. Should the plugs 606 and 611 be inserted in jacks 630 and 631 of transmission circuit 600 and the receiver plugs 604 and 605 be inserted in jacks 1007 and 1008 of transmission circuit 1000 or vice versa and a call be incoming ground on conductor 507 is extended over normal contacts of jacks 607 and 608 and conductor 656, back contact of relay 1009 to battery through the winding of relay 1057 thus operating the audible signal 1058. It is to be noted that if the plugs 606 and 611 and receiver plugs 604 and 605 are inserted in the jacks of the same transmission circuit that no circuit is possible for relay 1057.

What is claimed is:

1. An announcing system comprising a plurality of transparent films each having photographic sound traces thereon, clock-controlled means for periodically and successively advancing said films, means for illuminating an exposed portion of each film, a scanning prism for scanning the exposed portions of said films in succession, a photoelectric cell associated with said prism for producing telephonic currents in accordance with the variations of the photographic traces scanned by said prism, means for amplifying said telephonic currents, and means for impressing the amplified currents upon a telephone circuit.

2. An announcing system comprising a plurality of transparent films each having photographic sound traces thereon, clock-controlled means for periodically and successively advancing said films, means for illuminating an exposed portion of each film, a scanning prism for scanning the exposed portions of said films in succession, a photoelectric cell associated with said prism for producing telephonic currents in accordance with the variations of the photographic traces scanned by said prism, means for amplifying said telephonic currents, means for impressing the amplified currents upon a telephone circuit, and means for closing said telephone circuit only after said scanning prism has reached a particular position in its scanning movement.

3. An announcing system comprising a plurality of transparent films each having photographic sound traces thereon, clock-controlled means for periodically and successively advancing said films, a rotary scanning prism, means for positioning a portion of each of said films in an arc whose center coincides with the optical center of said prism, means for illuminating the arcuate portion of each film, a photoelectric cell associated with said prism for producing telephonic currents in accordance with the variations of the photographic sound traces of said films successively scanned by the rotation of said prism, means for amplifying said telephonic currents, and means for impressing the amplified currents upon a telephone circuit.

4. An announcing system comprising a plurality of transparent films each having photographic sound traces thereon, clock-controlled means for periodically and successively advancing said films, means for illuminating an exposed portion of each film, a photoelectric cell, means for successively scanning the exposed portions of said films for directing flashes of light from said illuminating means through said films to said photoelectric cell, and means including said cell and an amplifier for impressing telephonic currents generated by said cell upon a telephone circuit.

5. An announcing system comprising a plurality of film guiding tracks, each having an exposure window therein, a plurality of transparent films each having photographic sound traces thereon, clock-controlled means for periodically and successively advancing said films over said tracks to expose successive sound traces before said windows, means for illuminating the exposed portion of each film, a photoelectric cell, means for successively scanning the exposed portions of said films for directing flashes of light from said illuminating means through said films to said cell, and means including said cell and an amplifier for impressing telephonic currents generated by said cell upon a telephone circuit.

6. An announcing system comprising a plurality of film guiding tracks each having an exposure window therein, said tracks being positioned in a circular orbit, a plurality of transparent films each having photographic sound traces thereon, clock-controlled means for periodically and successively advancing said films over said tracks to expose successive sound traces before said windows, means for illuminating the exposed portion of each film, a scanner comprising a prism, lens system and optical slit mounted to rotate on a shaft positioned in the axis of said orbit, a photoelectric cell mounted in alignment with the axis of said shaft for producing telephonic currents in accordance with the variations of the photographic traces scanned by said scanner, means for amplifying said telephonic currents, and means for impressing the amplified currents upon a telephone circuit.

7. An announcing system comprising a plurality of arcuate film guiding tracks, each having an exposure window therein, said tracks being superposed one above the other about a common axis, a plurality of transparent films each having photographic sound traces thereon, clock-controlled means for periodically and successively advancing said films over said tracks to expose successive sound traces before said windows, means for illuminating the exposed portion of each film, a shaft mounted in the axis of said tracks having a separate scanning element for scanning each of said films, each element comprising a prism, lens system and optical slit, means for rotating said shaft for successively scanning the exposed portions of said films, a photoelectric cell mounted in alignment with the axis of said shaft for producing telephonic currents in accordance with the variation of the photographic traces scanned by said scanning elements, means for amplifying said telephonic currents and means for impressing the amplified currents upon a telephone circuit.

8. An announcing system comprising a plurality of arcuate film guiding tracks, each having an exposure window therein, said tracks being positioned with respect to a common axis, a plurality of transparent films each having photographic sound traces thereon, one of said films being positioned in a stationary manner in one of said film tracks, clock-controlled means for periodically and successively advancing the other said films over the other said tracks to expose successive sound traces before the windows of said tracks, means for illuminating the exposed portion of each film, a scanner mounted to rotate in the axis of said arcuate tracks, a photoelectric cell mounted in alignment with the axis of said arcuate tracks, said scanner having light deflecting and focusing means for projecting light passing from said illuminating means through the exposed portions of said films upon said photoelectric cell, means for rotating said scanner to scan said films in succession and means including said cell and an amplifier for impressing telephonic currents generated by said cell in accordance with the sound traces of said films upon a telephone circuit.

9. A time announcing system comprising a plurality of transparent films, one of said films having thereon photographic sound traces of the hour numerals one to twelve inclusive, a second of said films having thereon photographic sound traces of the minute numerals ten to twenty inclusive, thirty, forty, and fifty, a third of said films having thereon photographic sound traces of the minute numerals one to nine inclusive, clock-controlled means for periodically and successively advancing said films to expose sound traces corresponding to any hour and minute of the time of day, means for illuminating the exposed portions of said films, a scanner for scanning the exposed portions of the films in the order named, a photoelectric cell associated with said scanner for producing telephonic currents in accordance with the variation of the photographic traces scanned, means for amplifying said telephonic currents and means for impressing the amplified currents upon a telephone circuit.

10. A time announcing system comprising a plurality of transparent films, one of said films having thereon a photographic sound trace of a preliminary announcement, the second of said films having thereon photographic sound traces of the hour numerals one to twelve inclusive, a third of said films having thereon photographic sound traces of the minute numerals ten to twenty inclusive, thirty, forty and fifty, a fourth of said films having thereon photographic sound traces of the minute numerals one to nine inclusive, clock-controlled means for periodically and successively advancing said latter three films to expose sound traces corresponding to any hour and minute of the time of day, means for illuminating the exposed portions of all of said films, a scanner for scanning the exposed portions of the films in the order named, a photoelectric cell associated with said scanner for producing telephonic currents in accordance with the variation of the photographic traces scanned, means for amplifying said telephonic currents, and means for impressing the amplified currents upon a telephone circuit.

11. A time announcing system comprising a plurality of transparent films each having photographic sound traces thereon, a power shaft, driving shafts for advancing said films, magnetic clutches for coupling said driving shafts with said power shaft, a sequence switch driven by each of said driving shafts respectively, a clock, and circuits controlled by said clock and contacts of said sequence switches for energizing said magnetic clutches to cause the advance of said films periodically and in the proper sequence to expose sound traces of said films in accordance with the correct hour and minute of the time of day.

12. A time announcing system comprising a plurality of transparent films each having photographic sound traces thereon, a power shaft, driving shafts for advancing said films, magnetic clutches for coupling said driving shafts with said power shaft, a sequence switch driven by each of said driving shafts respectively, a clock, circuits controlled by said clock and contacts of said sequence switches for energizing said magnetic clutches to cause the advance of said films periodically and in the proper sequence to expose sound traces of said films in accordance with the correct hour and minute of the time of day, means for illuminating the exposed portions of said films, a photoelectric cell, a scanner having light deflecting and focusing means for projecting light passing from said illuminating means through the exposed portions of said films upon said photoelectric cell, means for driving said scanner from said power shaft to scan said films in succession, and means including said cell and an amplifier for impressing telephonic currents generated by said cell in accordance with the sound traces of said films upon a telephone circuit.

In witness whereof, I hereunto subscribe my name this 20 day of March 1931.

LESTER C. WARNER.